United States Patent [19]

Etoh et al.

[11] Patent Number: 4,870,584
[45] Date of Patent: Sep. 26, 1989

[54] SYSTEM AND METHOD FOR AUTOMATICALLY RUNNING A VEHICLE AT A DESIRED CRUISING SPEED

[75] Inventors: Yoshiyuki Etoh; Sadao Takase, both of Yokohama, Japan

[73] Assignee: Nissan Motor Company, Limited, Yokohama, Japan

[21] Appl. No.: 61,295

[22] Filed: Jun. 12, 1987

[30] Foreign Application Priority Data

Jun. 12, 1986 [JP] Japan .................. 61-135009
Jul. 14, 1986 [JP] Japan .................. 61-165335
Jul. 15, 1986 [JP] Japan .................. 61-166396

[51] Int. Cl.⁴ .................................... B60K 31/02
[52] U.S. Cl. ...................... 364/426.04; 364/424.01; 364/431.07; 180/170; 324/161; 123/349
[58] Field of Search .......... 364/424, 426, 565, 431.05, 364/426.04, 424.01, 431.07; 180/170; 340/993; 324/160, 161; 123/349, 350, 351, 352

[56] References Cited

U.S. PATENT DOCUMENTS

| | | | |
|---|---|---|---|
| 4,419,729 | 12/1983 | Kriedler | 123/352 |
| 4,453,516 | 6/1984 | Filsinger | 123/340 |
| 4,493,303 | 1/1985 | Thompson et al. | 123/352 |
| 4,737,913 | 4/1988 | Blee et al. | 364/426 |
| 4,748,565 | 5/1988 | Toya | 364/431.05 |

*Primary Examiner*—Parshotam S. Lall
*Assistant Examiner*—Thomas G. Black
*Attorney, Agent, or Firm*—Foley & Lardner, Schwartz, Jeffery, Schwaab, Mack, Blumenthal & Evans

[57] ABSTRACT

A system and method for automatically running a vehicle at a desired cruising speed, in which a running resistance of the vehicle is always derived, a target opening angle of a throttle valve of a vehicular engine which can run the vehicle at a desired constant acceleration and/or at the desired cruise running speed is derived under the derived running resistance, and the opening angle of the throttle valve is controlled in a feedforward control mode so as to coincide with the target opening angle. The automatic cruise running system and method can achieve no variation of vehicle speed when the vehicle runs on a rugged road.

26 Claims, 16 Drawing Sheets

FIG.6

ENGINE TORQUE Te [Kgm] TABLE A

| θ[deg]<br>Ne [rpm] | 0 | 2 | 4 | 6 | 8 | 10 | 12 | 14 | 16 | 18 | 20 | 22 | 24 | 26 | 28 | 30 |
|---|---|---|---|---|---|---|---|---|---|---|---|---|---|---|---|---|
| 800  | -2.0 | 3.0  | 5.2  | 6.3  | 7.0 | 7.4 | 7.6 | 7.7 | 7.8 | 7.8 | 7.8 | 7.8  | 7.8  | 7.8  | 7.9  | 7.9  |
| 1200 | -0.2 | 2.0  | 3.7  | 5.0  | 6.0 | 6.7 | 7.3 | 7.7 | 7.9 | 7.9 | 8.0 | 8.0  | 8.0  | 8.0  | 8.0  | 8.0  |
| 1600 | -1.5 | 0.8  | 2.5  | 3.9  | 5.1 | 6.1 | 7.0 | 7.7 | 8.3 | 8.7 | 8.9 | 9.0  | 9.1  | 9.1  | 9.1  | 9.1  |
| 2000 | -1.6 | 0.0  | 1.6  | 2.9  | 4.2 | 5.3 | 6.2 | 7.2 | 8.0 | 8.6 | 9.0 | 9.2  | 9.4  | 9.4  | 9.4  | 9.5  |
| 2400 | -2.0 | -0.6 | 0.7  | 1.9  | 3.2 | 4.4 | 5.6 | 6.7 | 7.9 | 8.8 | 9.6 | 10.2 | 10.5 | 10.5 | 10.6 | 10.6 |
| 2800 | -2.0 | -1.0 | 0.0  | 1.0  | 2.3 | 3.7 | 5.1 | 6.5 | 7.9 | 9.1 | 10.0| 10.4 | 10.4 | 10.5 | 10.5 | 10.6 |
| 3200 | -2.4 | -1.6 | -0.8 | 0.3  | 1.5 | 2.9 | 4.3 | 5.9 | 7.5 | 8.9 | 9.8 | 10.3 | 10.5 | 10.6 | 10.6 | 10.6 |
| 3600 | -3.5 | -2.7 | -1.8 | -0.8 | 0.4 | 1.7 | 3.1 | 4.8 | 6.4 | 7.9 | 9.0 | 9.9  | 10.4 | 10.7 | 11.0 | 11.3 |

FIG.7

TARGET THROTTLE VALVE OPENING ANGLE θs [deg] TABLE B

| Ne [rpm] \ Te [kgm] | -4 | -3 | -2 | -1 | 0 | 1 | 2 | 3 | 4 | 5 | 6 | 7 | 8 | 9 | 10 | 11 |
|---|---|---|---|---|---|---|---|---|---|---|---|---|---|---|---|---|
| 800 | 0.0 | 0.0 | 0.0 | 0.2 | 0.5 | 0.9 | 1.4 | 2.0 | 2.7 | 3.7 | 5.2 | 8.0 | 8.0 | 8.0 | 8.0 | 8.0 |
| 1200 | 0.0 | 0.0 | 0.0 | 0.0 | 0.2 | 1.1 | 2.0 | 3.1 | 4.4 | 6.0 | 8.1 | 11.0 | 18.0 | 18.0 | 18.0 | 18.0 |
| 1600 | 0.0 | 0.0 | 0.0 | 0.4 | 1.2 | 2.2 | 3.4 | 4.7 | 6.2 | 7.9 | 9.8 | 12.0 | 14.9 | 22.0 | 22.0 | 22.0 |
| 2000 | 0.0 | 0.0 | 0.0 | 0.8 | 2.0 | 3.3 | 4.6 | 6.1 | 7.7 | 9.5 | 11.4 | 13.5 | 15.9 | 20.0 | 20.0 | 20.0 |
| 2400 | 0.0 | 0.0 | 0.0 | 1.5 | 3.0 | 4.5 | 6.1 | 7.7 | 9.3 | 10.9 | 12.7 | 14.5 | 16.3 | 18.4 | 21.2 | 21.2 |
| 2800 | 0.0 | 0.0 | 0.0 | 2.0 | 4.1 | 6.0 | 7.5 | 9.0 | 10.4 | 11.8 | 13.3 | 14.7 | 16.1 | 17.8 | 20.0 | 20.0 |
| 3200 | 0.0 | 0.0 | 1.0 | 3.5 | 5.4 | 7.2 | 8.7 | 10.1 | 11.5 | 12.8 | 14.1 | 15.3 | 16.6 | 18.1 | 20.6 | 20.6 |
| 3600 | 0.0 | 1.4 | 3.6 | 5.6 | 7.3 | 9.0 | 10.4 | 11.8 | 13.1 | 14.2 | 15.5 | 16.7 | 18.2 | 19.9 | 22.3 | 25.5 |

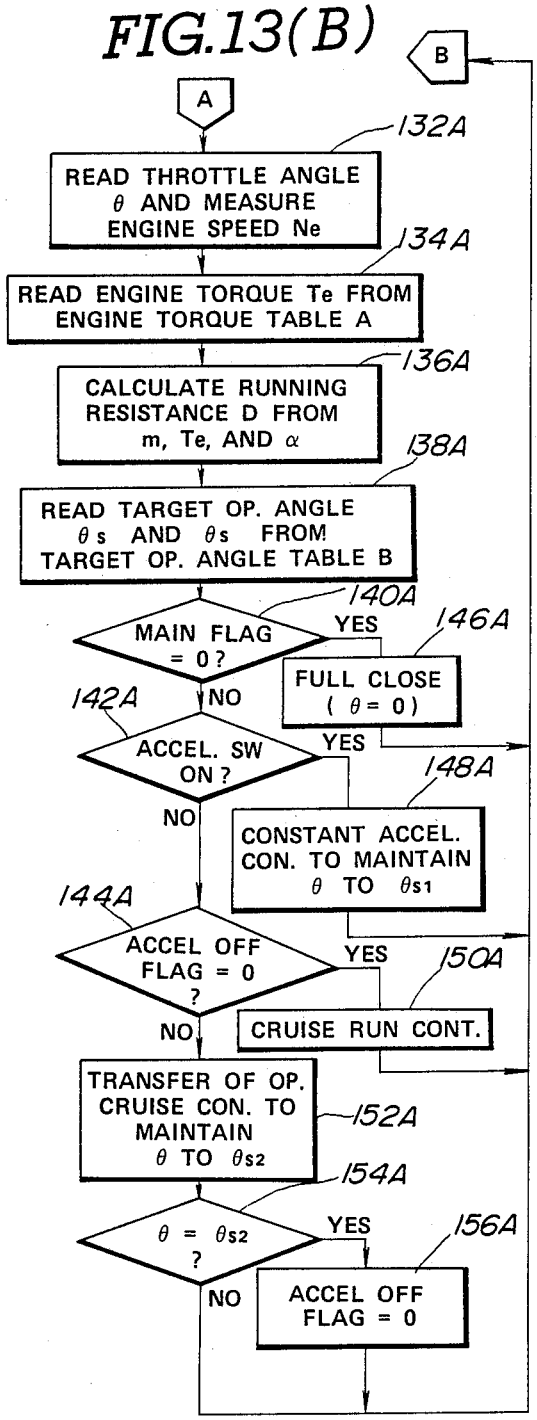

SYSTEM AND METHOD FOR AUTOMATICALLY RUNNING A VEHICLE AT A DESIRED CRUISING SPEED

BACKGROUND OF THE INVENTION

The present invention relates generally to a system and method for automatically running a vehicle at a desired cruising speed.

Japanese Patent Application First Publications Sho 47-35692, Sho 56-99518, Sho 60-71341, and Sho 60-50031 and Japanese Patent, Application Second Publication Sho 53-7592 exemplify such vehicle cruising speed running systems. In such systems as disclosed in the Japanese Patent Application Publications, a set switch is provided for setting a vehicle speed to a desired cruising speed when operated to turn on. When the set switch is operated, a vehicle speed adjusting mechanism (a throttle actuator) associated with a throttle valve of an engine mounted in the vehicle and independent of an accelerator pedal is actuated to adjust an angular displacement (opening angle) of the throttle valve so that the vehicle speed matches with the set cruising speed. In addition when a brake pedal or clutch pedal is operated during such a cruising speed control operation as described above, such a control operation as to maintain the vehicle speed at the set cruising speed is released and the vehicle speed is thereafter reduced. On the other hand, such a system as described above includes a resume switch. When the resume switch is operated, the system automatically returns the currently reducing vehicle speed due to the release of the cruising control operation to the set cruising speed before the operation of such a pedal as described above (resume function) at a constant acceleration. Furthermore, an acceleration switch is provided for running the vehicle at a constant acceleration when operated to turned on. When the acceleration switch is turned on, the control for the constant acceleration of the vehicle is started in which the opening angle of the throttle valve is adjusted so that the actual acceleration of the vehicle accords with the set acceleration. Thereafter, when the acceleration switch is operated turn off, the vehicle cruising speed control is started in which the vehicle speed is adjusted to reach a target vehicle speed which is the vehicle speed at the time of off operation of the acceleration switch. When the actual acceleration exceeds the set acceleration during the transfer of control from the constant acceleration to the cruising speed, a gain of vehicle speed control is corrected so as to prevent an overshoot of the vehicle speed.

From among these Japanese Patent Application Publications, for example, in the Japanese Patent Application First Publication (Tokkai) Sho No. 47-35692 published on Nov. 25, 1972, the automatic vehicle cruising speed running system for the vehicle calculates an integration error $\epsilon_I$ between a desired target vehicle speed $V_s$ and actual vehicle speed V for each predetermined period and calculates an proportional error $\epsilon_P$ between the present actual vehicle speed V(t) and vehicle speed V(t−Δt) before one period of the predetermined period in the following equations (a) and (b). Thereafter, a rate of change Δθ in the angular displacement of the throttle valve is calculated from the following equation (c) using the integration and proportional errors $\epsilon_I$ and $\epsilon_p$ and gain constants $K_I$, $K_p$.

$$\epsilon_I = V_S - V \quad (a)$$

$$\epsilon_P = V(t - \Delta t) - V(t) \quad (b)$$

$$\Delta\theta = K_I \times \epsilon_I + K_P \times \epsilon_P \quad (c)$$

In the system disclosed in the above-identified Japanese Patent Application document, the vehicle speed is feedback controlled, a total weight of the vehicle is changed due to the change in the number of occupants, and a gradient of road on which the vehicle runs is unknown.

Therefore, especially in a case when the vehicle runs on a rugged road, it is very difficult to always control the vehicle speed through the opening angle of the throttle valve and transmission shift position. Hence, the vehicle occupant(s) feels unpleasantly with the opening angle of the throttle valve varied unregularly and a hunting occurs in the vicinity of the target vehicle running speed so that it becomes, at this time, difficult to maintain the vehicle speed at the cruising speed.

In addition, in the Japanese Patent Application First Publication (Tokkai) Sho No. 56-99518 published on Aug. 10, 1981, with the resume switch operated so as to return the vehicle speed to the set vehicle speed $V_m$, the system calculates the vehicle acceleration for each predetermined period (e.g., 0.3 seconds) when the actual vehicle speed V is below a vicinity of the desired set cruising speed ($V < V_m - \Delta V$, wherein $\Delta V = 3$ km/h). Then, the constant acceleration control is carried out such that the vehicle acceleration indicates a constant (for example, 2 km/h.sec) and, on the other hand, the control of the vehicle speed is transferred to the normal cruising speed control when the actual vehicle speed is above the vicinity of the set cruising speed ($V \geq V_m - \Delta V$).

However, since a feedback control mode is used to carry out the constant acceleration in the vehicle cruising speed running system disclosed in the above-identified Japanese Patent Application Publication (Sho No. 56-99518), it is difficult to maintain the acceleration level constant in a case where a large disturbance such as a gradient resistance is added to a normal running resistance, when the vehicle runs on a rugged road. In this case, the opening angle of the throttle valve is unnecessarily varied.

In the Japanese Patent Application First Publication (Tokkai) Sho No. 60-50031 published on Mar. 19, 1985, the throttle valve is once fully opened for a predetermined interval of time when the cruising speed control is started in response to the on operation of the set switch to prevent a temporary reduction of the vehicle speed and the predetermined interval of time is extended in response to the change in the vehicle speed during the start of cruising speed control. To derive the extended predetermined interval of time, it is necessary to accurately detect the change in the vehicle speed. Hence, with the detection error of a vehicle speed sensor for sensing the vehicle speed taken into account, the extended interval of time is set longer to some degree. However, in this case, since the throttled valve is fully opened for the above-described extended interval of time set longer to some degree when the vehicle cruising speed control is started during the vehicle run on a descending slope such that the vehicle speed can be maintained at the target cruising speed with the throttle valve fully closed, the vehicle speed exceeds the target cruising speed and then the throttle valve is immediately closed. Thereafter, the vehicle speed is remarkably varied so that the vehicle occupant(s) feels unpleasant.

Furthermore, the vehicle cruising speed running system in the Japanese Patent Application First Publication (Tokkai) Sho No. 60-71341 has also a problem described below. That is to say, it is difficult to carry out an accurate control of constant acceleration of the vehicle in a case when the constant acceleration control of the vehicle is carried out during the vehicle run on the rugged road, since the control over the vehicle speed lags with respect to a remarkable change in the vehicle speed caused by the gradient of road. In addition, when the vehicle runs on the rugged road with the acceleration switch turned off after the once on operation thereof so that the vehicle speed control is transferred from the constant acceleration control mode to the cruising speed control mode, an overshooting and/or undershooting of the vehicle speed occur even if corrections of the feedback control and vehicle speed control gain are carried out. Consequently, the vehicle speed is remarkably varied with respect to the target cruising speed.

SUMMARY OF THE INVENTION

With the above-described problems in mind, it is an object of the present invention to provide a system and method for automatically running a vehicle at a desired cruising speed which can suppress variations of a vehicle speed so as to prevent an unpleasant feeling to a vehicle occupant(s) due to angular displacement variations of a throttle valve in a vehicular engine even when the vehicle runs on a rugged road.

It is another object of the present invention to provide the system and method for automatically running the vehicle at the desired cruising speed which can maintain the vehicle speed at the cruising speed without hunting of the vehicle speed even when a gradient resistance applied to the vehicle is considerably varied such as when the vehicle run on the rugged road.

It is still another object of the present invention to provide the system and method for automatically running the vehicle at the desired cruising speed which can maintain the acceleration to return the vehicle speed to the vicinity of a set cruising speed constant even when a large disturbance such as a gradient resistance is added to a normal running resistance in such a case as the vehicle runs on the rugged road.

It is yet another object of the present invention to provide the system and method for automatically running the vehicle at the desired cruising speed which can prevent a transient reduction of the vehicle speed without variations in the vehicle speed when the cruising speed control is started.

It is further another object of the present invention to provide an optimum system and method for automatically running the vehicle at the desired cruising speed which always enable a smooth transfer between a constant acceleration control and cruising speed control even if the vehicle runs on the rugged road.

The above-described objects can be achieved by providing a system for automatically running a vehicle at a desired cruising speed, comprising: (a) first means for deriving a vehicle speed; (b) second means capable of setting a desired cruise running speed; (c) third means for deriving a running resistance of the vehicle; (d) fourth means for deriving an engine revolution speed of a vehicular engine; (e) fifth means for deriving a gear position of a vehicular transmission; (f) sixth means for deriving an engine torque of the vehicular engine; (g) seventh means for deriving a target adjustment position of an engine revolution speed adjusting mechanism of a vehicular engine having a relationship to the cruise running speed set by the second means on the basis of the derived engine torque, engine revolution speed., gear position, and running resistance; (h) eighth means for deriving an adjustment position of the engine revolution speed adjusting mechanism of the vehicular engine; (i) ninth means for producing and outputting a vehicle speed control command on the basis of an error between the target adjustment position of the engine revolution speed adjusting mechanism derived by the seventh means and the adjustment position of the engine revolution speed adjusting mechanism derived by the eighth means and gear position of the vehicular transmission; and (j) tenth means responsive to the vehicle speed command outputted by the ninth means for actuating the engine speed adjusting mechanism to displace toward the target adjustment position derived by the eighth means.

The above-described objects can be achieved by providing a method for automatically running a vehicle at a desired cruising speed, comprising the steps of: (a) providing means capable of setting a desired cruise running speed; (b) determining whether the means sets the desired cruise running speed; (c) deriving a vehicle speed; (d) deriving an engine revolution speed;(e) deriving an adjustment position of an engine speed adjusting mechanism of a vehicular engine; (f) deriving a gear shift position of a vehicular transmission; (g) deriving an engine torque; (h) deriving a running resistance of the vehicle; (i) deriving a target adjustment position of the engine speed adjusting mechanism having a relationship to the cruise running speed determined in the step (b) on the basis of the derived engine torque, engine revolution speed, gear position, and running resistance; (j) producing and outputting a vehicle speed control command on the basis of an error between the target adjustment position of the engine speed adjusting mechanism derived in the step (h) and adjustment position of the engine speed adjusting mechanism derived in the step (e); and (k) actuating the engine speed adjusting mechanism to displace toward the target adjustment position in response to the vehicle speed control command.

BRIEF DESCRIPTION OF THE DRAWINGS

FIG. 6 is a characteristic table representing an engine torque with respect to an opening angle ($\theta$) of a throttle valve and engine revolution speed ($N_e$).

FIG. 7 is a characteristic table representing a target opening angle of the throttle valve with respect to the engine torque $T_e$ and engine revolution speed $N_e$.

FIGS. 13(A) and 13(B) are integrally an operational flowchart for explaining an operation of the entire system in a fifth preferred embodiment according to the present invention.

DETAILED DESCRIPTION OF THE PREFERRED EMBODIMENTS

Reference will hereinafter be made to the drawings in order to facilitate understanding of the present invention.

FIRST PREFERRED EMBODIMENT

Figure 1:
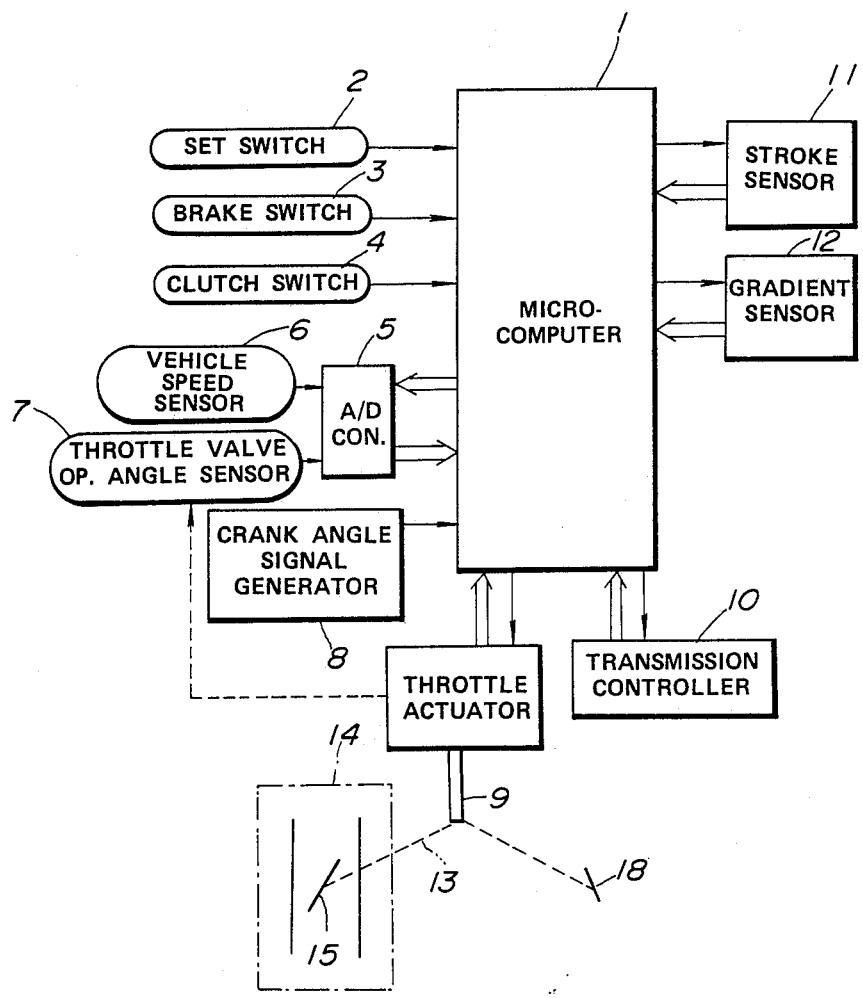
FIG. 1 is a circuit block diagram of a system for automatically running a vehicle at a desired cruising speed in a first preferred embodiment according to the present invention.

FIG. 1 shows a circuit block diagram of a system for automatically running a vehicle at a desired cruising speed in a first preferred embodiment. In FIG. 1, a microcomputer 1 constituted by a microprocessor receives output signals from a set switch 2, brake switch 3, clutch switch 4, vehicle speed sensor 6, throttle valve opening angle sensor 7, crank angle signal generator 8, throttle actuator 9, transmission controller 10, stroke sensor 11, and gradient sensor 12. The vehicle speed sensor 6 and throttle valve opening angle sensor 7 are connected to the microcomputer 1 via an analog-to-digital converter (A/D CON.) 5. The set switch 2 serves to command a target vehicle speed at which the vehicle cruises to the microcomputer 1. That is to say, in response to the activation of the set switch 2 the microcomputer 1 receives the vehicle speed signal from the vehicle speed sensor 6 as the target vehicle speed. After the set switch 2 is turned on, the system shown in FIG. 1 is maintained in an activation state so as to control the vehicle speed to match with the target vehicle speed until the brake switch 3 and/or clutch switch 4 is turned on. When the brake pedal and/or clutch pedal is depressed, the system interrupts the vehicle cruise running control.

The vehicle speed sensor 6 and throttle valve opening angle sensor 7 produce analog voltages proportional to the vehicle speed and opening angle (angular displacement) of the throttle valve 15. The crank angle signal generator 8 is used to measure an engine rotational speed. The throttle actuator 9 is of a pneumatic type or motor type and actuates a throttle valve 15 usually installed in a throttle chamber 14 of intake passage of the vehicular engine via a wire 13. At this time, the vehicle driver needs not to depress an accelerator pedal 18. The wire 13 is also connected to the accelerator pedal 18. The detailed construction of the throttle actuator 9 of the pneumatic type is exemplified by two U.S. patent application Ser. Nos. 07/043,468 and 07/043,532 both filed on Apr. 28, 1987 titled "A SYSTEM AND METHOD FOR AUTOMATICALLY CONTROLLING A VEHICLE SPEED TO A DESIRED CRUISING SPEED" in the name of Kouichi Suzuki et al. The disclosures of the two U.S. patent applications are hereby incorporated by reference. In addition, the opening angle of the throttle valve 15 is detected by means of the opening angle sensor 7 in response to the operation of the throttle actuator 9. The transmission controller 10 is a known transmission gear mechanism constituted by a fluid joint and so on. The microcomputer 1 receives a selected gear position information from the transmission controller 10.

The stroke sensor 11 detects a movement stroke of a vehicle body with respect to a road wheel using a potentiometer. In the first preferred embodiment, the stroke sensor 11 detects and outputs the respective movement strokes $l_1$, $l_2$, $l_3$, and $l_4$ with respect to four road wheels.

The gradient sensor 12 detects a gradient of an inclined road with respect to a horizontal position. The gradient sensor 12, for example, comprises a coil surrounding a housing and a magnetic fluid which moves along an inclined direction of the vehicle so that an inductance of the coil is changed.

Next, an operation of the entire system in the first preferred embodiment will be described with reference to FIGS. 2(A) and 2(B).

In a step 100, the microcomputer 1 determines if the set switch 2 is operated (turned on).

If the set switch 2 is operated (Yes) in the step 100, the microcomputer 1 sets a MAIN FLAG in a RAM (Random Access Memory) to a "1" and sets the vehicle speed V derived from the vehicle speed sensor 6 at which the vehicle cruises as the present vehicle speed $V_s$ in a step 110. At this time, when either the brake switch 3 or clutch switch 4 is turned on in a step 120, the MAIN FLAG is reset to "0" and the activation state of the whole system shown in FIG. 1 is released in a step 130. In a step 140, the microcomputer 1 confirms whether the MAIN FLAG is set at "1". If "1" in the step 140, the system shown in FIG. 1 to carry out the following process.

If the vehicle speed V in a predetermined range (in the first preferred embodiment, V>30 km/h but V<120 km/h) is inputted in steps 150 and 160, the routine goes to a step 170, in which the microcomputer 1 determines whether a predetermined period of time (,e.g., 300 msec.) has elapsed. When the predetermined period of time has elapsed, routine goes to a step 180. For each predetermined period of time, an integration error between the vehicle speeds $V_s$ and V described above is calculated as follows; $\epsilon_I = V_s - V$ in a step 180. In a step 190, the microcomputer 1 fetches the vehicle speed v(t−Δt) one period before the present period from its memory. In a step 200, the microcomputer 1 calculates a proportional error $\epsilon_P = v(t-\Delta t) - v(t)$ (v(t): the present vehicle speed). In a step 210, the opening angle $\theta$ of the throttle valve 15 is read from the throttle valve opening angle sensor 7. The engine revolution speed $N_e$ is calculated on the basis of the number of pulses from the crank angle signal generator 8.

Next, a running resistance D is calculated to determine a target opening angle $\theta_s$ of the throttle valve 15 in the following manner. If the running resistance is D and an engine torque required to make a constant run at the target vehicle speed $V_s$ is $T_e$, the engine torque $T_e$ is given in the following equation (1).

$$T_e = (R/\gamma m \times \eta m \times \gamma n \times \eta n) \times D \quad (1)$$

In addition, the running resistance D is calculated as follows:

$$D = \mu W + W \sin \delta + KSV_s^2 \quad (2)$$

In the equations (1) and (2), $\gamma m$ and $\eta m$ denote a transmission gear ratio and transmission efficiency in the selected transmission shift position m. $\gamma n$ and $\eta n$ denote a final reduction gear ratio and final transmission efficiency, R denotes a radius of tire, $\mu$ denotes a rolling resistance coefficient. W denotes a total weight of a vehicle body including a vehicle occupant(s), $\delta$ denotes a road gradient, K denotes an air resistance coefficient, and S denotes a front surface projecting area.

Hence, since $\mu = 0.018$ when the vehicle runs. e.g., on a paved freeway, unknown elements in the equations (1) and (2) are W and $\delta$. However, since $\delta$ is continuously inputted from the gradient sensor 12, the running resistance D is calculated if W becomes known.

The calculation method of the total weight W will be described below.

If a straight distance is l between a center of gravity G of the vehicle body with respect to a weight $W_o$ of the vehicle body only and another center of gravity G' of the vehicle body with respect to a sum W ($=W_o+\Delta W$) of an increased weight $\Delta W$ by a vehicle occupant(s) and the vehicle body $W_o$, the straight distance l is calculated on the respective movement strokes $l_1, l_2, l_3,$ and $l_4$ of the vehicle body with respect to each road wheel.

Figure 3:
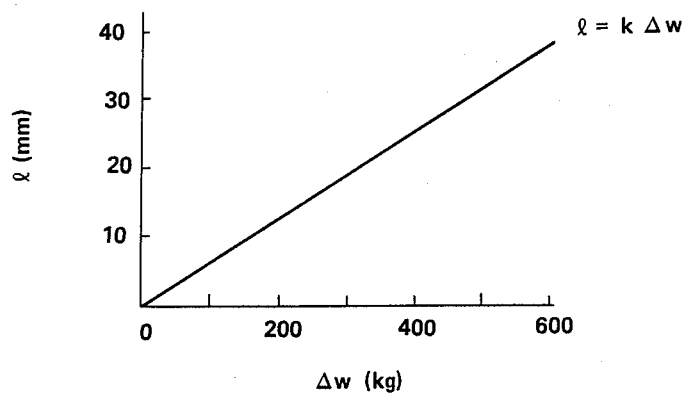
FIG. 3 is a characteristic graph representing a relationship between a movement stroke of a center of gravity in the vehicle and increased amount of weight applied to a vehicle body in the first preferred embodiment.

Hence, if a spring constant of a suspension link of the vehicle body is k, the following equation (3) will be established as shown in FIG. 3.

$$l = K \times \Delta W \quad (3)$$

$\therefore \Delta W = l/k.$ Therefore, $$W = W_o + \Delta W = W_o + l/k \quad (4)$$

Figure 4:
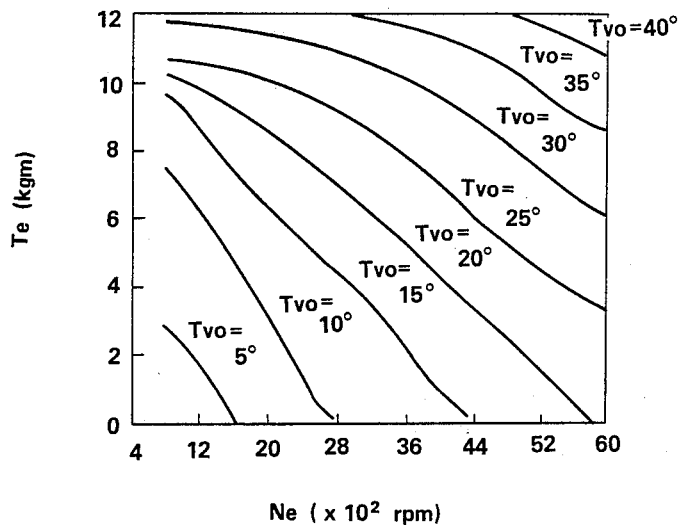
FIG. 4 is a characteristic graph representing a target opening angle table of a throttle valve with respect to an engine torque $T_e$ and engine revolution speed $N_e$.

In this way, the total weight W is calculated in a step 230. In a step 240, the road gradient $\delta$ is detected by the gradient sensor 12 and inputted into the microcomputer 1. In a step 250, the running resistance D is calculated using the equation (2). Then, the engine torque $T_e$ is derived using the above equation (1). In this way, the running resistance D, the engine revolution speed $N_e$, the present transmission shift position m, and target vehicle speed $V_s$ are derived. Thereafter, the routine goes to a step 260, in which a target opening angle $\theta_s$ corresponding to the calculated engine torque $T_e$ and revolution speed $N_e$ is read from a table representing a performance data of the engine (stored in the memory (e.g.. ROM (Read Only Memory)) of the microcomputer 1 shown in FIG. 4.

In a step 270, a difference $\epsilon_{74}$ between the target throttle valve opening angle $\theta_s$ and actual throttle valve opening angle $\theta$ is calculated in a step 270 ($\epsilon_\theta = \theta_s - \theta$). In a step 280, an error function $\epsilon$ is calculated in the following equation (5) if gain constants are $K_I$, $K_p$, and $K_\theta$.

$$\epsilon = K_I \epsilon_I + K_P \epsilon_P + K_\theta \epsilon_\theta \quad (5)$$

The calculated error function $\epsilon$ corresponds to a change rate $\Delta\theta$ of the throttle valve opening angle in a step 290.

Next, the throttle actuator 9 is activated to adjust the opening angle of the throttle valve 15 to the target opening angle $\theta + \Delta\theta$ (provided that $\theta \geq 0$) in a step 300. If $\epsilon < \epsilon_O$ ($\epsilon_O$ denotes a predetermined angle value) (Yes) in a step 310, the transmission controller 10 controls the gear shift position to shift in a third gear range to increase a driving force. If $\epsilon \geq \epsilon_o$ (No) in the step 310, the transmission controller 10 controls the gear shift position in an overdrive (OD) position in a step 320. It is noted that in the first preferred embodiment, the stroke sensor 11 may be replaced with a vehicle height sensor using a supersonic wave for deriving a height of a vehicle body with respect to the ground or a link load sensor for directly detecting a load on the suspension link.

As appreciated from the description on the first preferred embodiment, the system is applicable to each kind of vehicles if the characteristics data of each vehicle, and spring constant of the link or engine performance are previously derived.

SECOND PREFERRED EMBODIMENT

Figure 5:
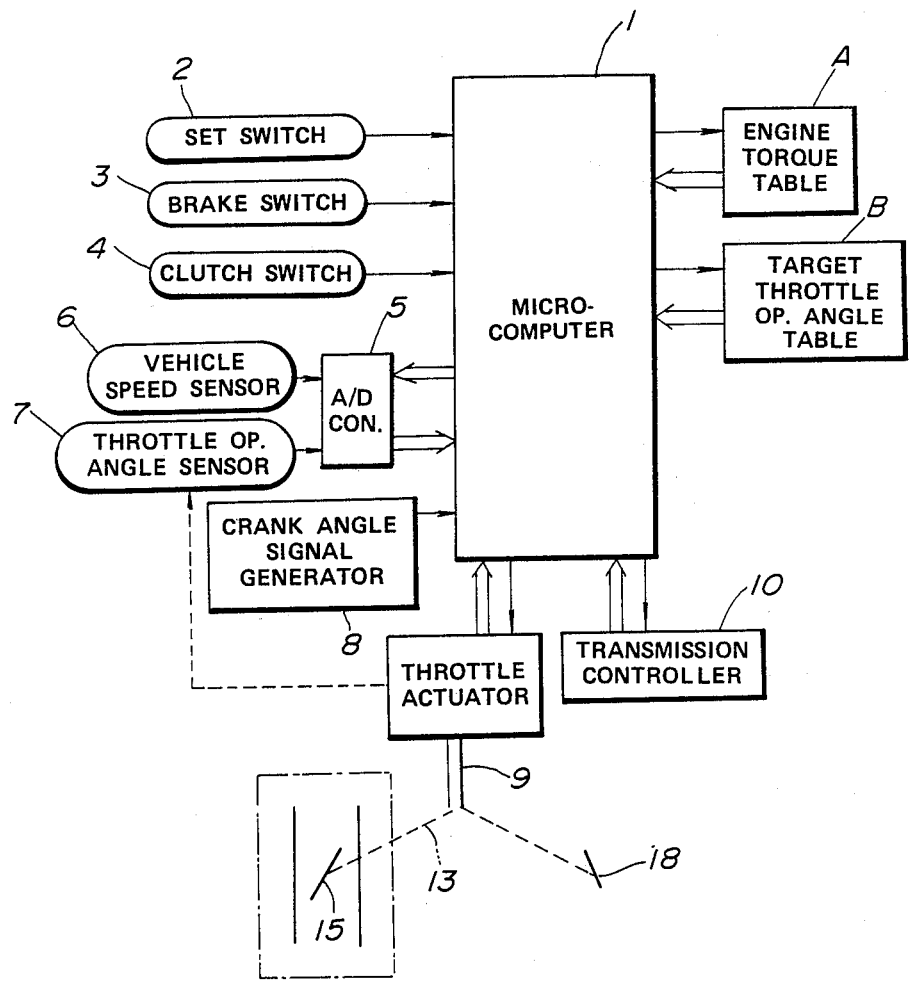
FIG. 5 is a circuit block diagram of the automatic vehicle cruise running system in a second preferred embodiment according to the present invention.

FIG. 5 shows a circuit block diagram of the system for automatically running the vehicle at the cruising speed in a second preferred embodiment. As shown in FIG. 5, the system in the second preferred embodiment is not provided with the stroke sensor 11 and gradient sensor 12 shown in FIG. 1.

In the second preferred embodiment shown in FIG. 5, however, an engine torque table A and target throttle valve opening angle table B are stored in the memory of the microcomputer 1 such as ROM (Read Only Memory). The other constructions are the same as those in the first preferred embodiment.

The engine torque table A shown in FIG. 6 is provided to read the engine torque $T_e$ from the engine revolution speed $N_e$ and the throttle valve opening angle $\theta$ through a table look-up technique. The throttle valve opening angle table B shown in FIG. 7 is provided to read the target opening angle $\theta_s$ of the throttle valve 15 from the engine revolution speed $N_e$ and engine torque $T_e$ through the table look-up technique. Each value of the target opening angle is inherently determined by the engine mounted in the vehicle.

FIGS. 6 and 7 are examples of V shaped 2 1 turbo engine (VG 20ET).

Next, an entire operation of the system shown in FIG. 5 will be described with reference to FIGS. 8(A) and 8(B).

Figure 2:
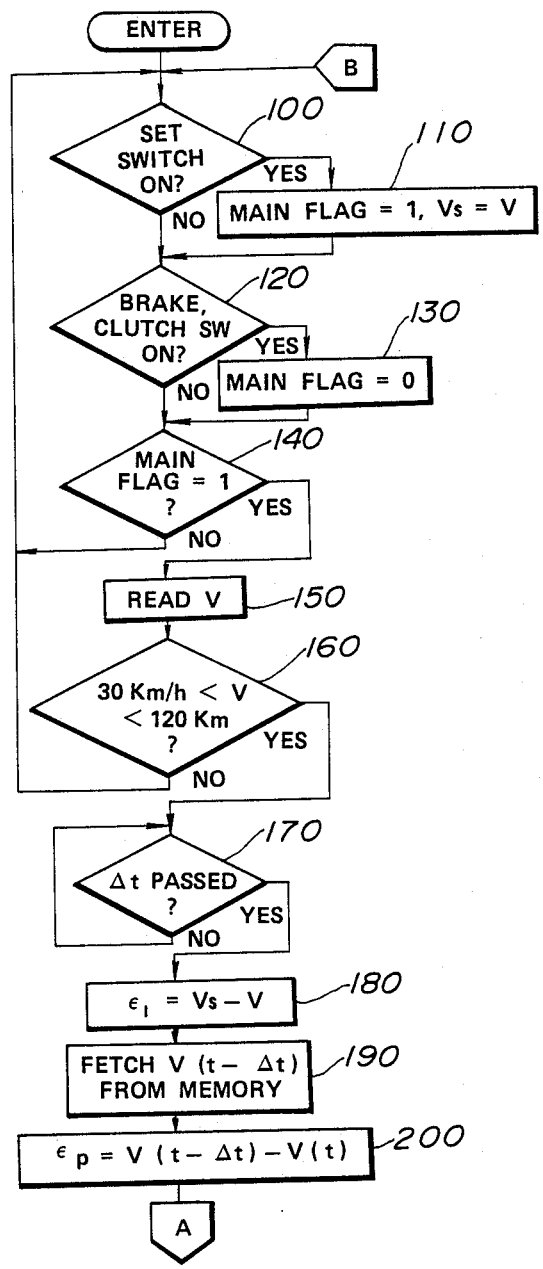
FIGS. 2(A) and 2(B) are an integrally operational flowchart for explaining an operation of the entire system in the first preferred embodiment shown in FIG. 1.
Figure 2B:
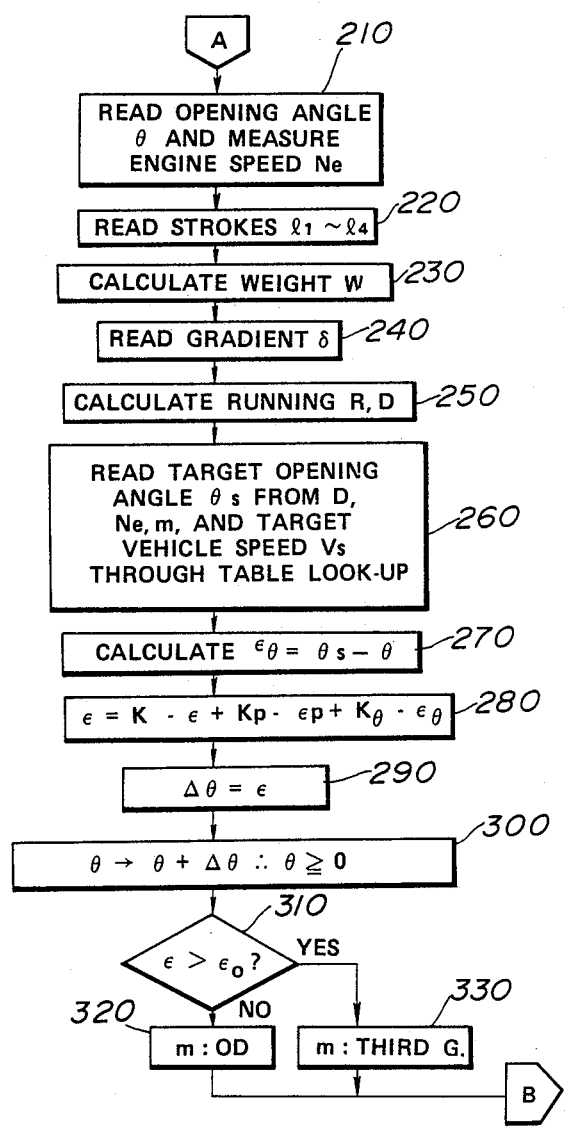
Figure 8:
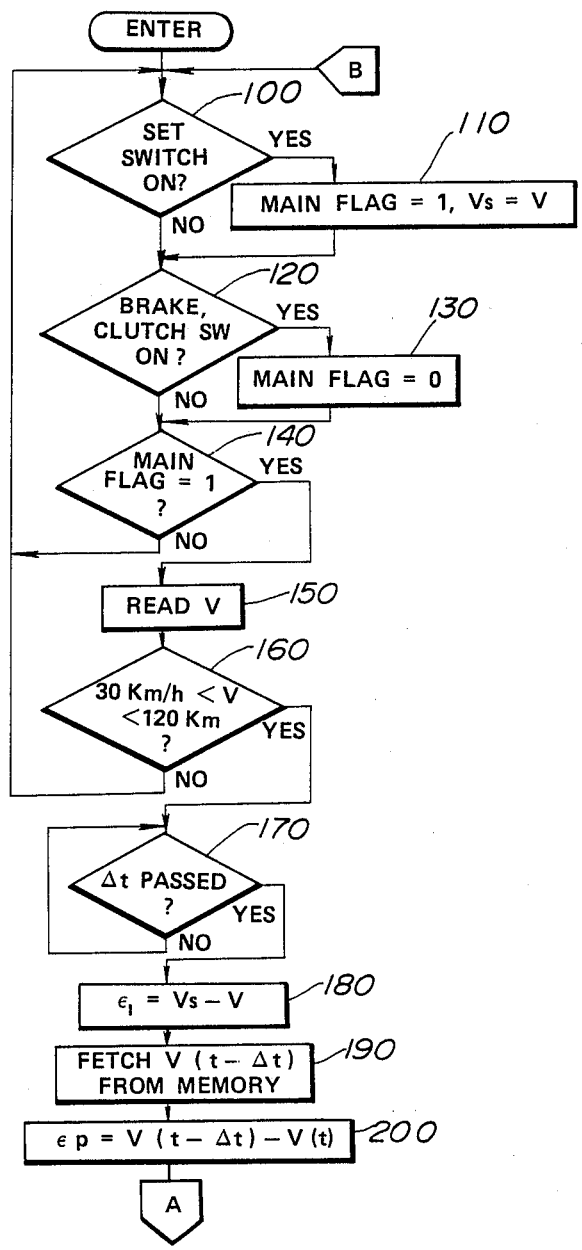
FIGS. 8(A) and 8(B) are an integrally operational flowchart for explaining the operation of the system in the second preferred embodiment shown in FIG. 5.
Figure 8B:
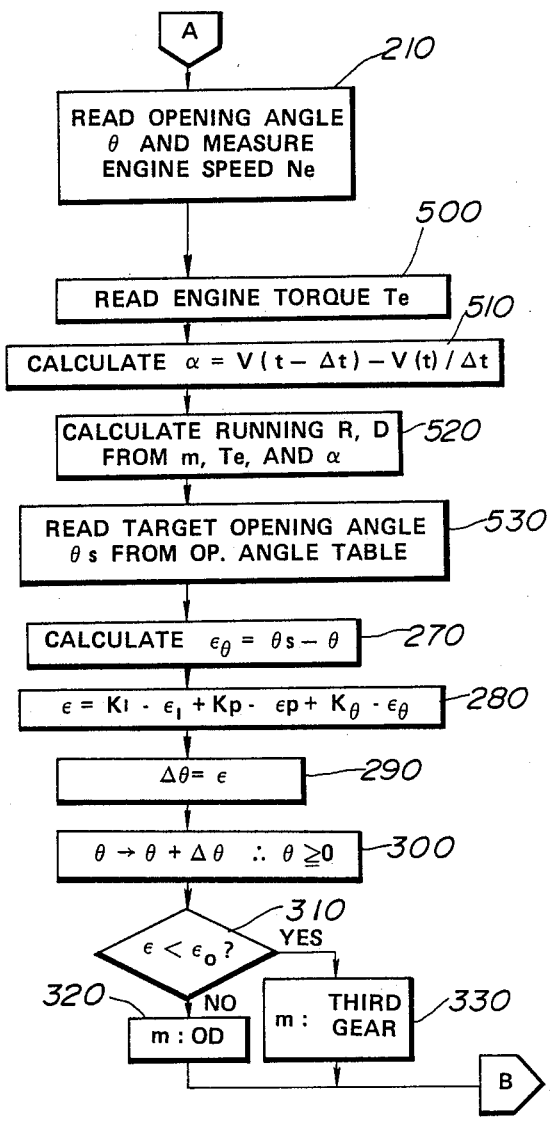

In FIG. 8(A), the steps 100 to 210 and steps 270 to 330 are the same as those shown in FIGS. 2(A) and 2(B) executed in the first preferred embodiment. Therefore, the detailed description thereof are omitted here.

In a step 500, the microcomputer 1 reads the engine torque $T_e$ from the engine torque table A shown in FIG. 6 using the engine revolution speed $N_e$ measured in the step 210 and opening angle $\theta$ of the throttle valve 15 read in the same step 210.

In a step 210, the vehicle acceleration $\alpha$ is calculated. It is noted that the proportional error $\epsilon P$ derived in the step 200 may be used as the vehicle acceleration $\alpha$. In the next step 520, the running resistance D is calculated.

It is noted that the following equation (6) is established between the engine torque $T_e$ and running resistance D.

$$T_e = (R/\gamma m \times \eta m \times \gamma n \times \eta n)[D + (W/g)\alpha + (\alpha/R^2)J] \quad (6)$$

In the equation (6), $$J = J_W + \gamma n^2 \eta n J_P + (J_T + J_E)\gamma m^2 \eta n^2 \eta n$$

wherein $J_W$ denotes a wheel inertia, $J_P$ denotes a propeller inertia, $J_T$ denotes a turbine inertia, $J_E$ denotes an engine inertia, and the other constants are the same as those described in the first preferred embodiment.

Therefore, the microcomputer 1 calculates the running resistance D using the following equation:

$$D = (\gamma m \eta m \gamma n \eta n / R)T_e - (W/g)\alpha - (\alpha/R^2)J \quad$$

Then, the engine torque $T_e$ when the vehicle makes a cruising run at the target vehicle speed is derived from the above equation (6) in which $\alpha = 0$. That is to say, $$T_e = (R/\gamma m \eta n \gamma m \eta n).D \quad (7)$$

On the other hand, the engine revolution speed $N_e$ is given in the following equation (8).

$$N_e = (\gamma m \eta n / 2\pi R).60.V_S \quad (8)$$

The engine torque $T_e$ and engine revolution speed $N_e$ derived using the above equations (7) and (8) are used to read the target opening angle $\theta_S$ of the throttle valve 15 from the target throttle valve opening angle B shown in FIG. 7 in a step 530. In the way described above, the target throttle valve opening angle $\theta_s$ is derived. Thereafter, the vehicle speed control is carried out in accordance with the steps 270 to 330. In the second preferred embodiment, the target opening angle $\theta_s$ of the throttle valve 15 can properly be estimated according to the running resistance D which continuously varies with the road gradient and direction of wind with respect to the vehicle.

THIRD PREFERRED EMBODIMENT

Figure 9:
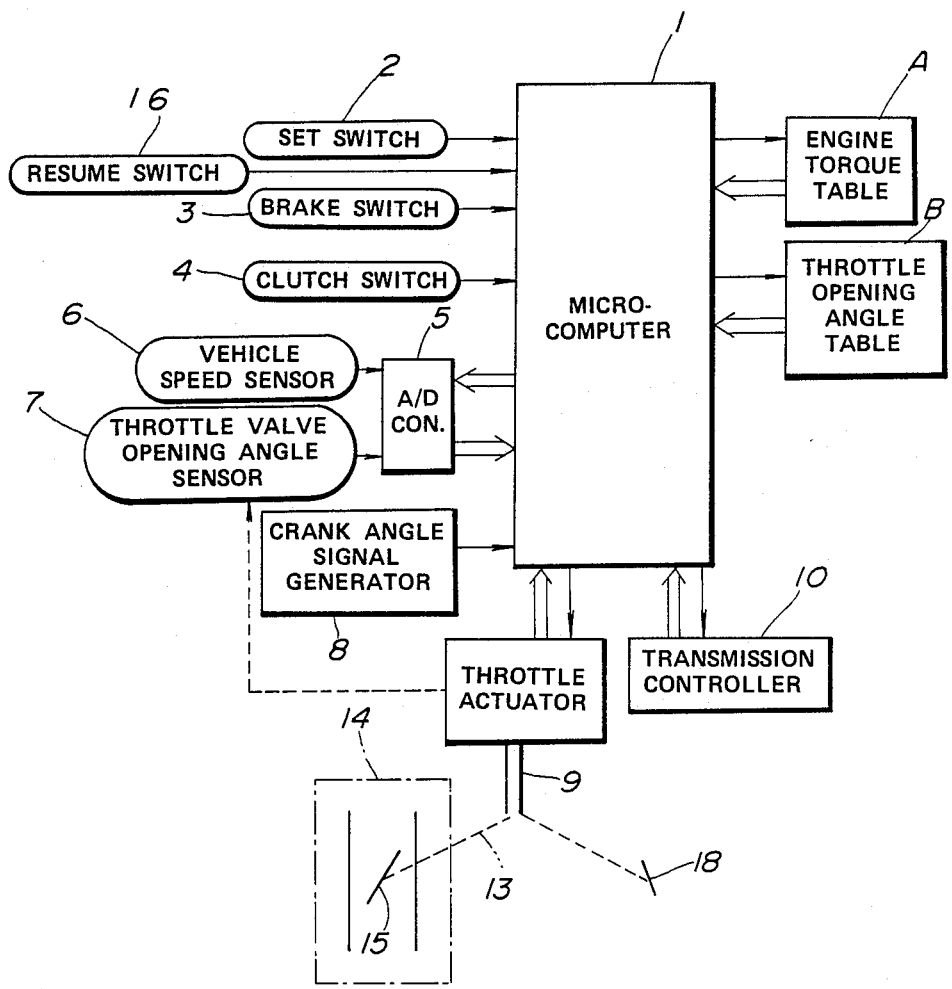
FIG. 9 is a circuit block diagram of the automatically vehicle cruise running system in a third preferred embodiment according to the present invention.
Figure 10A:
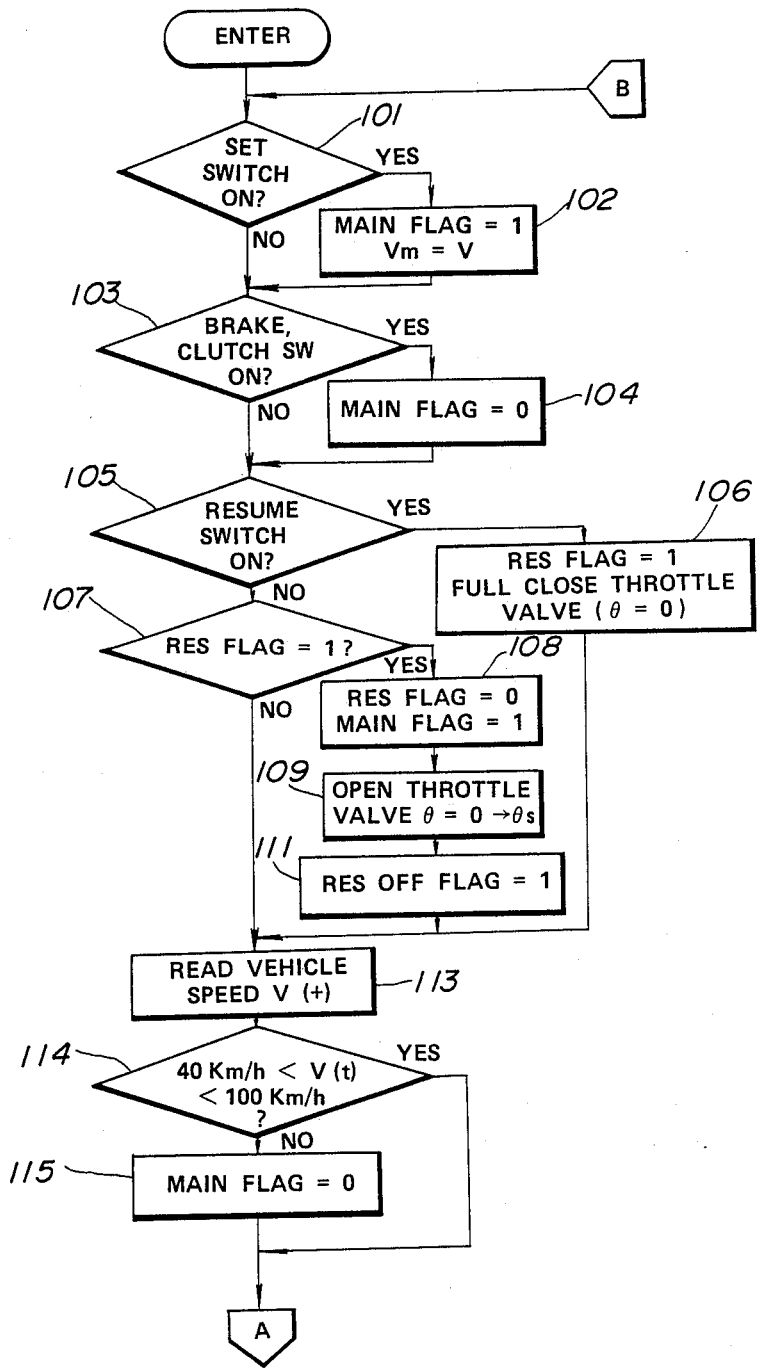
FIGS. 10(A) and 10(B) are integrally an operational flowchart for explaining the operation of the entire system shown in FIG. 9.
Figure 10B:
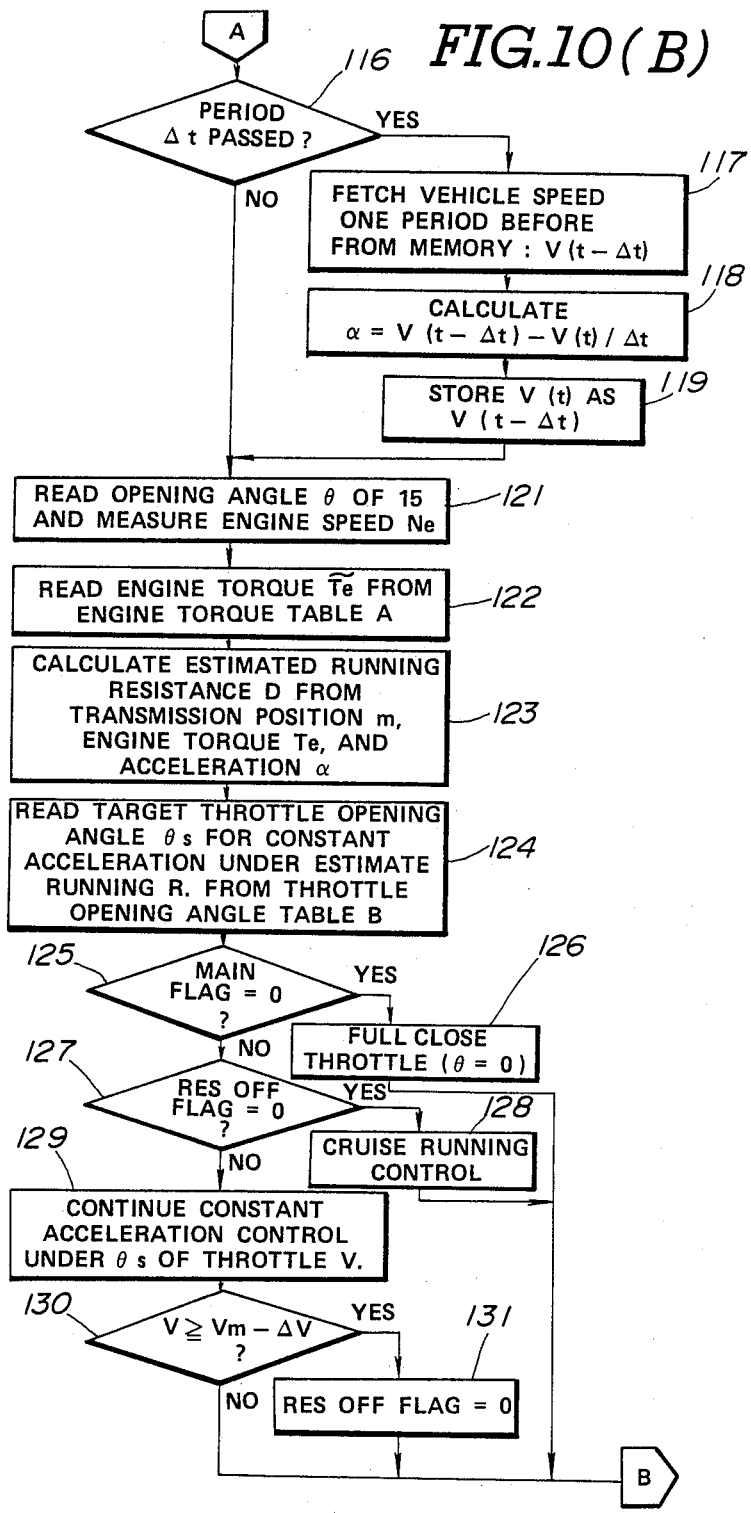

FIG. 9 and FIGS. 10(A) and 10(B) show a circuit block diagram and an operational flowchart on the automatic cruise running system in a third preferred embodiment. It is noted that, as shown in FIG. 9, the hardware construction of the third preferred embodiment is substantially the same as that of the second preferred embodiment. The detailed description thereof is omitted here.

However, a resume switch 16 is additionally connected to the microcomputer 1 as shown in FIG. 9. The resumed switch 16 becomes actuable after the operation of either the brake pedal or clutch pedal is released. The release of the cruise running control is carried out in response to operation of either the brake switch 3 or clutch switch 4. The microcomputer 1 upon receipt of the output activation signal of the resume switch 16 has a resume function to automatically return the vehicle speed to the desired speed at a constant rate (acceleration) in the cruising state set before the release operation by means of either the brake switch 3 or clutch switch 4. The cruise running control is, as described above, released when either the brake switch 3 or clutch switch 4 is turned on.

Next, an operation of the microcomputer 1 in the third preferred embodiment will be described with reference to FIGS. 10(A) and 10(B).

The contents of steps 101, 102, 103, and 104 are the same as the steps 100, 110, 120, and 130 shown in FIG. 2(A).

In a step 105 the microcomputer 1 determines whether the resume switch 16 is turned on when neither the brake switch 3 nor clutch switch 4 becomes turned on in the step 103 or when the MAIN FLAG is set to zero in the step 104. If the resume switch 16 is on in the step 105, the routine goes to a step 106 in which the microcomputer 1 sets a RES FLAG to "1" and outputs a throttle actuation command to actuate the throttle valve 15 in a fully closed position (i.e., the opening angle $\theta$ of the throttle valve 15 is zero). Then the routine goes to a step 113.

On the other hand, if the resume switch 16 is in the off state in the step 105 and the RES FLAG is set at "1" in a step 107, i.e., it is a time immediate after the resume switch 16 has been turned off after once turn on thereof, the routine goes to a step 108 in which the RES FLAG is set to "0" and MAIN FLAG is set to "1". In the next step 109, a constant acceleration control is initiated such that the throttle valve 15 normally in the fully closed state at this time is opened until the opening angle thereof reaches the target opening angle $\theta_s$ to be described later. In a step 111, a RES OFF FLAG is set to "1" and the routine goes to the step 113.

If the RES FLAG is at "0" in the step 107, i.e., when the off state of the resume switch 19 continues, the routine goes directly to the Step 113. The steps 105 to 111 indicate processing routine at the time of on or off operation of the resume switch 16.

It is noted that the meaning of each state of the flags is described below:

MAIN FLAG=1 . . . under the cruise running control;

MAIN FLAG=0 . . . under release of the cruise running control;

RES FLAG=1 . . . the resume switch is in the on state;

RES FLAG=0 . . . the resume switch is in the off state;

RES OFF FLAG=1 . . . under the control for the constant acceleration (the opening angle of the throttle valve $\theta$ =target opening angle of the throttle valve $\theta_s$); and RES OFF FLAG=0 . . . the completion of the constant acceleration control.

Steps 113 to 119 constitute a calculation block of the acceleration in which each processing from the steps 117 to 119 is executed for each lapse of a predetermined period $\Delta t$ (for example. $\Delta t = 1$ sec.).

In the step 113, the microcomputer 1 receives the output signal from the vehicle speed sensor 6 indicative of the vehicle speed V. In the step 114, the microcomputer 1 determines whether the vehicle speed V(t) falls in such a range as expressed by 40 km/h<V(t)<100 km/h. If No (V(t)≦40 km/h or V(t)≧100 skm/h). the routine goes to the step 115 in which the MAIN FLAG is reset to "0" and goes to the step 116. If Yes (40 km/h<V(t)<100 km/h). the routine goes directly to the step 116.

In the step 116, the microcomputer 1 determines whether the predetermined period $\Delta t$ has elapsed. If the predetermined period $\Delta t$ has elapsed, the routine goes to the step 117. In the step 117, the microcomputer 1 fetches the vehicle speed value V(t−Δt) one period before the present predetermined period from the memory. In the step 118, the acceleration $\alpha$ is calculated in accordance with the following equation (a).

$$\alpha = (V(t-\Delta t) - V(t))/\Delta t \qquad (a)$$

In the step 119, the vehicle speed V(t) is stored in the memory as V(t−Δt) and the routine goes to a step 121. If the predetermined period Δt is not elapsed in the step 116, the routine goes directly to a step 121.

Steps 121 to 124 constitute a processing block of calculation of the target opening angle $\theta_s$ of the throttle valve 15.

In the step 121, the opening angle $\theta$ of the throttle valve 15 is read from the throttle valve opening sensor 7 and the engine revolution speed $N_e$ is measured from the output signal of the crank angle signal generator 8. In the step 122, the microcomputer 1 reads an estimated engine torque $T_e$ from the engine torque table A shown in FIG. 6 on the basis of the throttle valve opening angle $\theta$ and engine revolution speed $N_e$ derived in the step |2|. The engine torque $T_e$ has the following relationship to the acceleration $\alpha$ and estimated running resistance D.

$$T_e = (R/\gamma m \eta m' \gamma n \eta n)(D = (W/g\alpha) = J\alpha/R^2 \qquad (b)$$

Then, $J = J_W \cdot \gamma n^2 \cdot \eta n J_p + (J_T + J_E)/\gamma m^2 \gamma n^2 \eta m \eta n$ $$\therefore D = (\gamma m \eta m' \gamma n \eta n/R)T_e - W\alpha/g - J\alpha/R^2 \qquad (b)$$

The calculation of running resistance D is carried out in a step 123. In the step 123, the running resistance D is calculated using the equation (b)' in which at first the value derived in the step 122 is used as the engine torque $T_e$ and acceleration $\alpha$ is zero until the predetermined period has not elapsed from the time when the resume switch 16 has been turned off after once turn on thereof. In the step 124, the target opening angle $\theta_2$ is read from the throttle valve opening angle table B, e.g., shown in FIG. 7.

That is to say, the estimated engine torque $T_e$ to carry out control of the vehicle speed at the constant acceleration $\alpha$ with the running resistance D derived in the step 123 can be derived from the equation (b) wherein $\alpha = a$. That is to say, $$T_e = (R/\gamma m \eta m' \gamma n \gamma n)(D = W/g a = J a/R^2) \qquad (c)$$

The target opening angle $\theta_s$ can be read from the table B shown in FIG. 7 using the engine torque $T_e$ derived from the equation (c) and engine revolution speed $N_e$ derived in the step 121. After the target opening angle $\theta_s$ is derived in the steps 121 to 124, the routine goes to a flag check processing block constituted by steps 127 to 128.

In the step 125, the microcomputer 1 determines whether the MAIN FLAG is "0". If the MAIN FLAG=0 (under the release of the cruise control). the routine goes to the step 126 in which the throttle valve 15 is fully closed ($\theta = 0$) and the routine returns to the step 101. If the MAIN FLAG is "1" in the step 125, the routine goes to the step 127 in which the microcomputer 1 determines whether the RES OFF FLAG is "0". If the RES OFF FLAG is "0". the routine goes to the step 128 in which the vehicle speed V(t) is controlled to match with the set vehicle speed $V_s$ and the routine returns to the step 101.

in the Step 127, the RES OFF FLAG is set to "1" (under the control of constant acceleration) and the routine goes to a step 129.

Steps 129 to 131 constitute a constant acceleration control completion determination block. In the step 129, the constant acceleration control is continued in which the actual throttle valve opening angle $\theta$ is set to the target throttle valve opening angle $\theta_s$. Then the routine goes to the step 129. In the step 130, the microcomputer 1 determines whether the vehicle speed V has reached a vicinity of the stored vehicle speed $V_m$ stored in the step 102. If the vehicle speed is determined to be above the vicinity of the stored vehicle speed ($V \geq V_m - \Delta V$). the routine goes to the step 131. In the step 131, the RES OFF FLAG is reset to "0" (the completion of the constant acceleration control) and the routine returns to the step 101. On the other hand, if the stored vehicle speed is determined to be less than the vicinity of the stored vehicle speed ($V < V_m - \Delta V$), the routine returns directly to the step 101.

In the way described above, the running resistance continuously varied can be estimated before the operation of the resume function and the vehicle speed is feedforward controlled under the latest estimated running resistance immediately after the resume function has been carried out. Therefore, even if a large disturbance such a gradient resistance is added to the normal running resistance in such a case as the vehicle runs on the rugged road, the constant acceleration can be achieved without variation of the vehicle speed under the desired acceleration. In addition, since the vehicle speed adjusting mechanism is stably operated without irregular displacement of the throttle valve, the vehicle occupant(s) does not feel unpleasantly.

FOURTH PREFERRED EMBODIMENT

Figure 11:
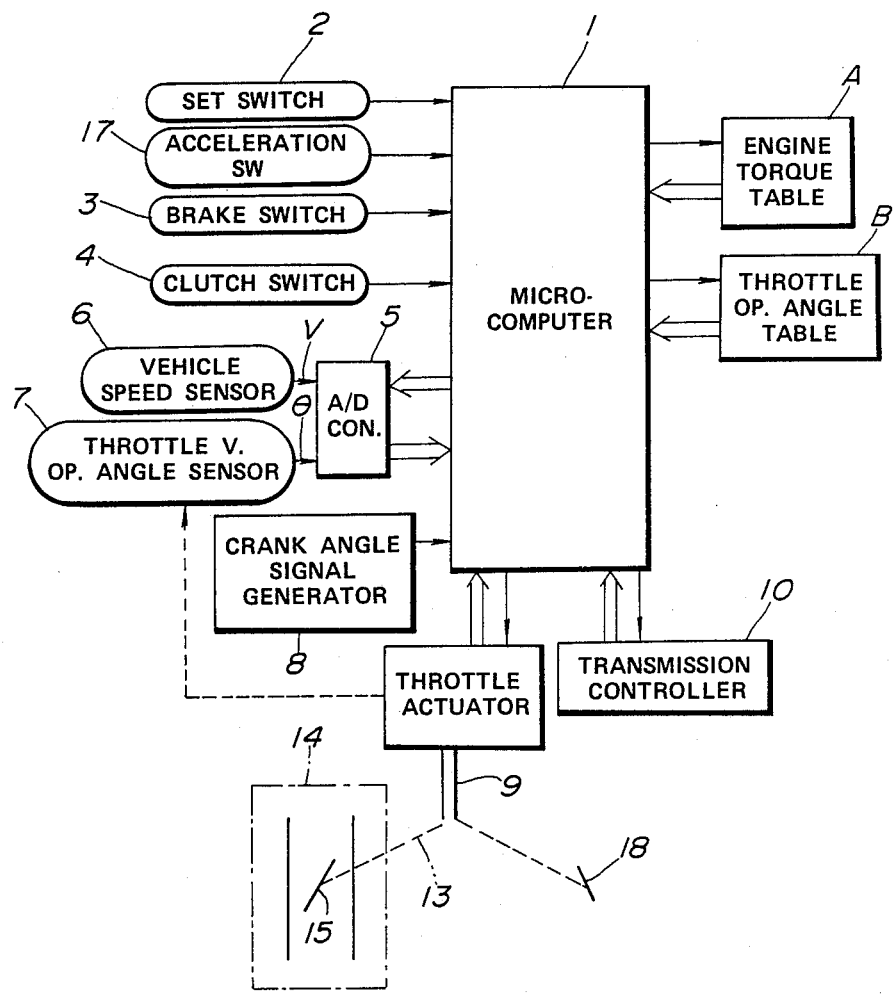
FIG. 11 is a circuit block diagram of the automatic vehicle cruise running system in a fourth preferred embodiment according to the present invention.

FIG. 11 shows a circuit block diagram of the automatic cruise running system in a fourth preferred embodiment In FIG. 11, the throttle valve 15 in the throttle chamber 14 of the engine is actuated by means of the throttle actuator 9 or accelerator pedal 18 via the wire 14. The throttle actuator 9 is controlled by means of the microcomputer 1 constituting a throttle valve opening angle control circuit. The hardware construction of the fourth preferred embodiment is substantially the same as that of the second and third embodiments. The detailed description thereof is omitted here. For an acceleration switch 17, the detailed function will be described later.

Figure 12:
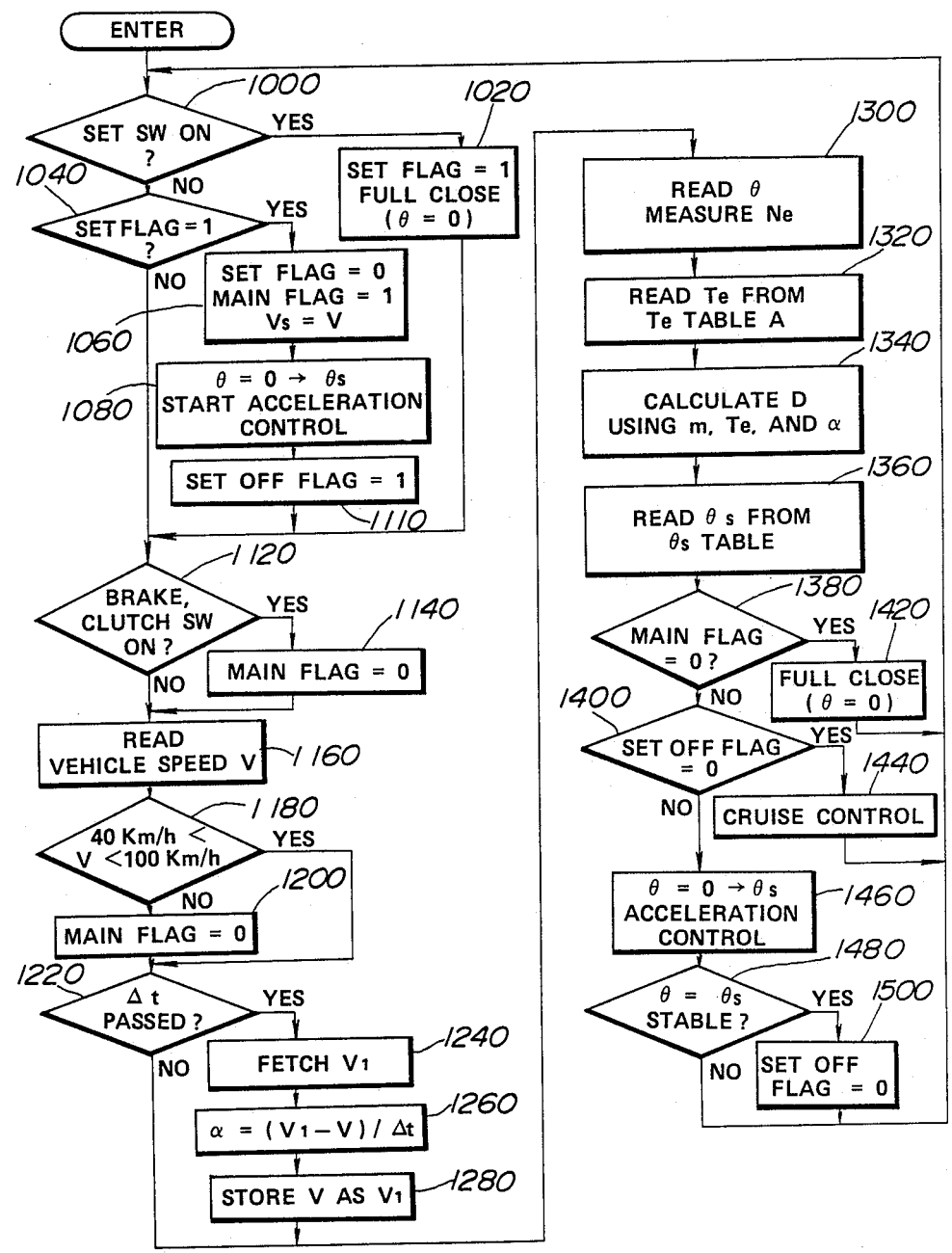
FIGS 12(A) and 12(B) are integrally an operational flowchart for explaining an operation of the entire system shown in FIG. 11.

FIGS. 12(A) and 12(B) integrally show an operational flowchart on which the automatic cruise running system in the fourth preferred embodiment shown in FIG. 11 is executed.

In a step 1000, the microcomputer 1 determines first whether the set switch 2 has been operated. If the set switch 2 has been operated, a SET FLAG is set to "−1" and the throttle valve 15 is once fully closed in a step 1020.

On the other hand, if the set switch 2 has not been operated in the step 1000, the microcomputer 1 determines whether the SET FLAG has been set in a step 1040. When the SET FLAG is set to "1". i.e., it is a time after the set switch 2 has been turned off after once turn on thereof, the SET FLAG is reset to "0" and the MAIN FLAG is set to "1" in a step 1060. Then, the present vehicle speed V derived from the vehicle speed sensor 6 is set as the target vehicle speed $V_s$ for the cruise run of the vehicle in the same step 1060.

In a step 1080, such a control is initiated as to open the throttle valve 15 to an opening angle $\theta_s$ through which the vehicle can maintain the vehicle speed at the target vehicle speed $V_s$ under the present running load D. In a step 1100, a SET OFF FLAG is set to "1".

Then, in a step 1120 the microcomputer 1 determines whether either the brake switch 3 or clutch switch 4 is turned on in response to a depression operation of either the brake pedal or clutch pedal. When either brake or clutch switch 3 or 4 is turned on, the MAIN FLAG is reset in a step 1140.

The processing for the respective switch operations is carried out in the above-described way. The present vehicle speed V detected by means of the vehicle speed sensor 6 is read in a step 1160. The microcomputer 1 determines if the vehicle speed falls in such a range as 40 km<V<100 km/h in a step 1180. If the present vehicle speed V is out of the speed range described above, the MAIN FLAG is reset to zero in a step 1200.

In a step 1220, the microcomputer 1 determines whether the control predetermined period $\Delta t$ (for example, 1 second) has elapsed. If Yes in the step 1220, the detected vehicle speed $V_1$ at the previous control period is fetched from the memory in a step 1240.

In a step 1260, the acceleration is $\alpha$ is calculated as follows: $\alpha = (V_1 - V)/\Delta t$.

In a step 1280, the present vehicle speed V is stored in a memory as the previous vehicle speed $V_1$.

In a step 1300, the microcomputer 1 calculates the engine revolution speed $N_e$ from the output signal of the crank angle signal generator 8 and reads the actual opening angle $\theta$ of the throttle valve 15 from the generator 8.

In a step 1320, the engine torque $T_e$ is read from the engine torque table A, e.g.. shown in FIG. 6 on the basis of the engine-revolution speed $N_e$ derived in the step 1300 (load) and actual opening angle $\theta$ of the throttle valve 15.

In a step 1340, the present running resistance D is calculated using the engine torque $T_e$, acceleration $\alpha$, and present gear position m of the vehicle automatic transmission. That is to say, if $J = J_W + \gamma n^2 \cdot \eta n \cdot J_p + (J_T + J_e) \cdot \gamma m^2 \cdot \gamma n^2 \cdot \eta m \cdot \eta n$, $T_e = R(D+W\ \alpha/g + J\alpha/R^2)/\gamma m \eta m \gamma n \eta n$ and $D = \gamma m \cdot \eta m \cdot \gamma n \cdot \eta n \cdot T_e/R - \alpha/R - J\ \alpha/R^2$. Therefore, if the values m, $T_e$, and a are derived, the present running resistance D can be derived. As described above, when the present Vehicle running resistance D is derived at each predetermined period of control, the target opening angle $\theta_s$ through which the vehicle can maintain the target vehicle speed $V_s$ constant is read from the target opening angle table B, e.g., shown in FIG. 7 under the calculated running resistance D. That is to say, if $\alpha = 0$, the engine torque $T_e$ can be derived as follows:

$$T_e = R \cdot D/\gamma m \eta m \gamma n \eta n \quad (A)$$

$$\text{In addition, } N_e = \gamma m \eta n 60 \cdot V_s/2\pi R \quad (B)$$

Thus, the target opening angle $\theta_s$ is read using the engine output torque $T_e$ derived from the equation (A) and engine revolution speed $N_e$ derived from the equation (B) (step 1360) from the target opening angle table B shown in FIG. 7.

In a step 1380, the microcomputer 1 determines whether the MAIN FLAG is reset to "0".

In a step 1400, the microcomputer 1 determines whether the SET OFF FLAG is reset.

If the flag MAIN FLAG is reset (Yes) in the step 1380, the routine goes to a step 1420 in which the throttle valve 15 is once fully closed since the vehicle is not run under the cruise running control or the cruising speed control is released due to the depression operation of either the clutch pedal or brake pedal. Thereafter, the vehicle speed is manually adjusted in accordance with a depression operation on the accelerator pedal 18.

If the MAIN FLAG is not reset to zero in the step 1380 and the SET OFF FLAG is reset to zero in the step 1400, the throttle valve 15 is angularly displaced in a direction in which the detected vehicle speed V coincides with the target vehicle speed $V_s$ (cruise running control) in a step 1440.

Furthermore, if neither MAIN FLAG nor SET OFF FLAG is reset to zero in the steps 1380 and 1400, i.e., if the start of the vehicle cruising speed control is indicated with the off operation of the set switch 2 upon the once completion of the on operation thereof, the acceleration control to open the throttle valve 15 is continued until the throttle opening angle reaches the target opening angle ($\theta = 0 \rightarrow \theta_s$) so that the vehicle can maintain the target vehicle speed $V_s$ under the present running resistance D in a step 1460.

In the next step 1480, the microcomputer confirms whether the opening angle $\theta$ of the throttle valve is stable at the target opening angle $\theta_s (\theta = \theta_s)$. If Yes in the step 1480, the routine goes to a step 1500 in which the SET OFF FLAG is reset and thereafter the cruising speed control of the vehicle is started (steps 1000, 1040, 1060, 1100, 1500, 1400, and 1440).

In the fourth preferred embodiment as described above, the running resistance D of the vehicle is always calculated and the target opening angle $\theta_s$ of the throttle valve through which the vehicle can maintain the cruising speed is always derived on the basis of the running resistance thus calculated. When the cruise running control is commanded in response to the off operation of the set switch 2 once after the on operation of the set switch 2 (on-and-off operations of the set switch 2), the opening angle $\theta$ of the throttle valve 15 is controlled to match with the target opening angle $\theta_s$ through which the vehicle can maintain the target vehicle speed $V_s$ under the present running resistance D and the cruise running control operation is started when the throttle valve opening angle becomes stable at the target opening angle $\theta_s$. Therefore. without a temporary reduction of the vehicle speed at the time of cruise running control start, the optimum vehicle speed control can be achieved. In addition, the vehicle speed is not varied during the start of the cruise running control.

FIFTH PREFERRED EMBODIMENT

Figure 13A:
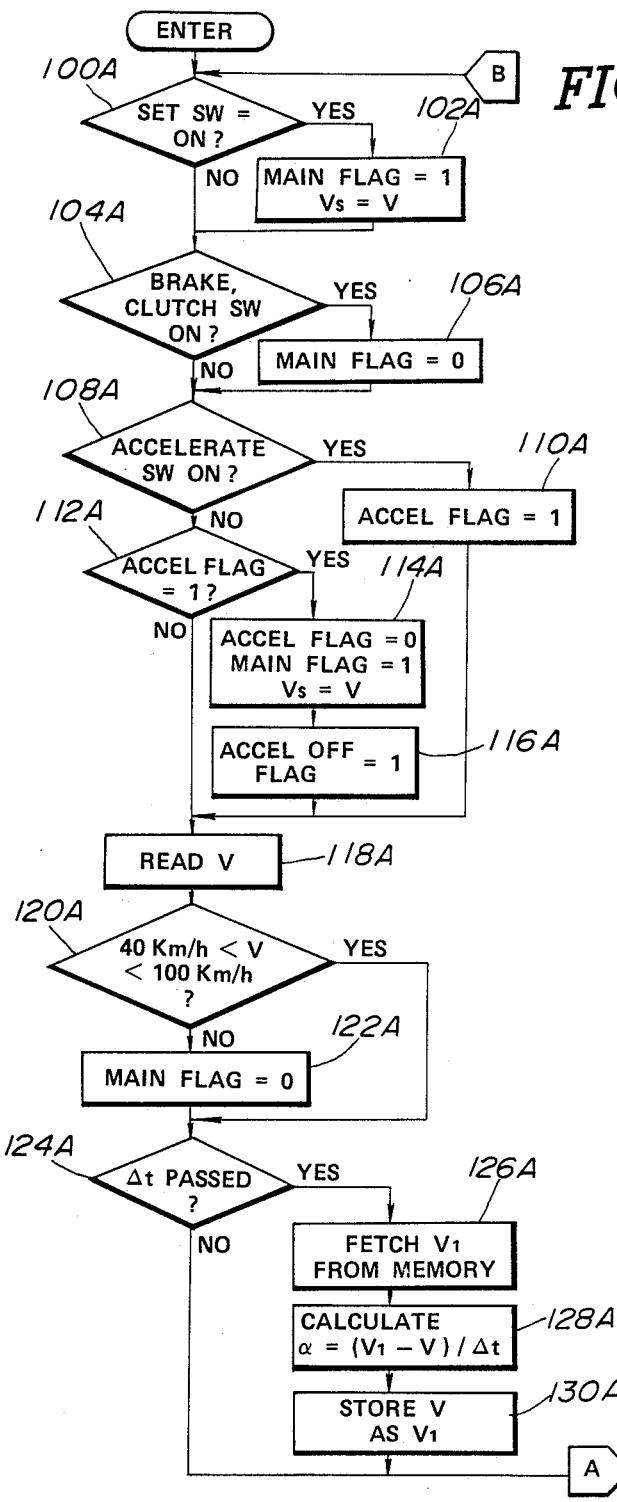

FIGS. 13(A) and 13(B) integrally show an operational flowchart of the automatic cruise running system in a fifth preferred embodiment. It is noted that the hardware construction is the same as shown in FIG. 11 of the fourth embodiment.

In FIGS. 13(A) and 13(B), in a step 100A the microcomputer 1 first determines whether the set switch 2 is turned on. When the set switch 2 is turned on, the MAIN FLAG is set to "1". The present vehicle speed V is set as the target vehicle speed $V_s$ under the vehicle cruise running in a step 102A. In a step 104A, the microcomputer 1 determines whether either the brake switch 3 or inhibit switch (clutch switch) 4 is turned on. When either the brake or clutch switch is turned on, the MAIN FLAG is reset in a step 106A.

Furthermore, the microcomputer 1 determines whether the acceleration switch 17 shown in FIG. 11 is turned on in a step 108A. If the acceleration switch 17 is turned on, an ACCEL FLAG is set to 1 in a step 110A. If the acceleration switch 17 is not turned on, the microcomputer 1 determines whether the ACCEL FLAG is set in a step 112A. If the ACCEL FLAG has been set in the step 112A, the routine goes to a step 114A in which the ACCEL FLAG is reset to "0" and MAIN FLAG is set to "1". In the Step 114A, the microcomputer 1 sets the present vehicle speed V as the target vehicle speed $V_s$ under the vehicle cruise running control. In a step 116A, an ACCEL OFF FLAG is set to "1". When the ACCEL FLAG is not set to "1" in the step 112A, the ACCEL FLAG is set in the step 110A, or the ACCEL OFF FLAG is set in the step 116A, the routine goes to a step 118A in which the microcomputer 1 reads the vehicle speed v from the vehicle speed sensor 6. The present vehicle v detected by the vehicle speed sensor is read in the step 118A. In a step 120A, the microcomputer 1 determines whether 40 km/h < v < 100 km/h. If yes in the step 120A, the routine goes to a step 124A. If no (i.e., v ≧ 40 km/h, v > = 100 km/h) in the step 120A, the routine goes to a step 1222A in which the MAIN FLAG is set to "0". In a step 124A, the microcomputer 1 determines whether the predetermined period Δt has passed. If yes, i.e., the predetermined period Δt has passed in the step 124A, the routine goes to a step 126A in which the previous vehicle speed $v_1$ one period before the predetermined period Δt is fetched from the memory. Then, in a step 128A the microcomputer 1 calculates the acceleration in the following equation: $\alpha = (v_1 - v)/\Delta t$. In a step 130A, the microcomputer 1 stores the present vehicle speed v as the previous vehicle speed $v_1$ in the memory.

In the next step 132A shown in FIG. 13(B), the actual opening angle $\theta$ is read from the throttle valve opening angle sensor 7. The engine revolution speed $N_e$ is measured from the output signal of the crank angle signal generator 8 in the same step 132A. In a step 134A, the estimated engine torque $T_e$ is read from the engine torque table A. e.g., shown in FIG. 6. In a step 136A, the running resistance D of the vehicle is derived using the present gear position m of the automatic transmission (a manual transmission is also possible), the acceleration $\alpha$, and engine torque $T_e$. The calculation method of the running resistance is the same as that described in the previous preferred embodiments.

After the microcomputer 1 derives the running resistance D of the vehicle, a first target opening angle $\theta_{s1}$ for the constant acceleration through which the vehicle can run at the constant acceleration and a second target opening angle $\theta_{s2}$ for the cruise speed through which the vehicle can maintain the speed at the target vehicle speed $V_s$, stored in the step 102A are respectively read from the throttle valve opening angle table B. e.g., shown in FIG. 7 on the basis of the running resistance D.

For the first target opening angle $\theta_{s1}$, the engine output torque $T_e$ at which the vehicle can constantly be accelerated at the acceleration is derived from the following equation.

$$T_e = R(D + Wa/g + Ja/R^2)/\gamma m \eta m \gamma n \eta n$$

The first target opening angle $\theta_{s1}$ which corresponds to both the engine output torque $T_e$ and engine revolution speed $N_e$ is read from the throttle valve opening angle table B.

The second target opening angle $\theta_{s2}$ is derived from the equation: $T_e = R(D + Wa/g + J \alpha/R^2)/\gamma m \eta m \gamma n \eta n$ in which the vehicle acceleration $\alpha = 0$, i.e. $T_e = RD/\gamma m \eta m \gamma n \eta n$ (aa). Therefore, the engine output torque $T_e$ at which the vehicle can cruise at the target vehicle speed $V_s$ can be derived. The engine revolution speed $N_e$ at which the vehicle can cruise at the target vehicle speed $V_s$ can be derived from the following equation:

$$N_e = \gamma m \times \gamma n \times 60 \times V_s/2\pi R \qquad \text{(bb)}$$

Thus, the second target opening angle $\theta_{s2}$ is read using the engine output torque $T_e$ derived from the equation (aa) and engine revolution speed $N_e$ derived from the equation (bb).

In the way described above, the first target opening angle $\theta_{s1}$ through which the vehicle can accelerate at the constant acceleration $\alpha$ and the second target opening angle $\theta_{s2}$ are derived on the basis of the present estimated running load D on the real time base. In a step 140A, the microcomputer 1 determines whether the MAIN FLAG is reset. In a step 142A, the microcomputer determines whether the acceleration switch 17 is turned on. In a step 144A, the microcomputer 1 determines whether the ACCEL OFF FLAG is reset.

If the MAIN FLAG is reset (i.e., in cases wherein the vehicle does not cruise at the cruising speed and wherein the cruise running control is released due to a depression on either the brake or clutch pedal), the routine goes to a step 146A in which the throttle valve is once fully closed ($\theta = 0$). Thereafter, the vehicle speed is adjusted in accordance with the depression operation of the accelerator pedal 8.

When the on operation of the acceleration switch 17 is confirmed, the opening angle of the throttle valve is held at the first target opening angle $\theta_{s1}$ in a step 148A. Consequently, the engine torque $T_e$ is generated at which the vehicle can be accelerated at the constant acceleration under the present running load D.

When the ACCEL OFF FLAG is reset in the step 144A, the throttle valve 15 is actuated in a direction in which the detected vehicle speed v matches with the target vehicle speed $V_s$ in a step 150A so that the vehicle speed V is controlled to coincide with the target vehicle speed $V_s$ (cruise running control of the vehicle). If the microcomputer 1 determines that the ACCEL OFF FLAG is not set in the step 144A, i.e., the acceleration switch 17 is turned off after the acceleration switch is once turned on to indicate that the control is transferred to the cruise running control from the constant acceleration control, the opening angle of the throttle valve is maintained at the target opening angle $\theta_{s2}$ in a step 152A. Consequently, the torque $T_e$ at which the vehicle can maintain the target vehicle speed Vs under the present running load D. Thereafter, the microcomputer 1 determines whether the opening angle $\theta$ is stably equal to the second target opening angle $\theta_{s2}$ in a step 154A. When the ACCEL OFF FLAG is reset in a step 156A, the cruise running control of the vehicle is started through the pass of the steps 108A, 112A, 114A, 116A, 142A, 144A, and 150A.

In this embodiment, as shown in FIGS. 13(A) and 13(B), the running resistance D is always derived and both first and second opening angles $\theta_{s1}$ and $\theta_{s2}$ are always derived. During the control of the constant acceleration, the opening angle $\theta$ of the throttle valve 15 is adjusted to the first target opening angle $\theta_{s1}$ and during the transfer of control from the constant acceleration to the cruise running control the opening angle thereof is adjusted to the second target opening angle $\theta_{s2}$. Therefore, if the gradient of road is remarkably changed so that the running resistance D is varied during the vehicle run on the rugged road, the vehicle can accurately be run at the constant acceleration and the vehicle speed can maintain the target vehicle speed $V_s$ during the transfer of control from the constant acceleration to the cruise run. Hence, it makes possible to provide an accurate control for the constant acceleration and provide a smooth transfer of control from the constant acceleration to the cruise run. Consequently, an optimum vehicle speed control can be achieved.

In the way described hereinabove, the system and method for automatically running the vehicle speed at the desired cruising speed according to the present invention can achieve the suppression of vehicle speed variations even when the vehicle runs on the rugged road.

It will fully be appreciated by those skilled in the art that the foregoing description has been made in terms of preferred embodiments and various changes and modifications may be made without departing from the scope of the present invention which is to be defined by the appended claims.

What is claimed is:

1. A system for automatically running a vehicle at a desired cruising speed, comprising:
   (a) first means for deriving a vehicle speed;
   (b) second means for setting a desired cruise running speed;
   (c) third means for deriving a running resistance of the vehicle;
   (d) fourth means for deriving an engine revolution speed of a vehicular engine;
   (e) fifth means for deriving a gear position of a vehicular transmission;
   (f) sixth means for deriving an engine torque of the vehicular engine;
   (g) seventh means for deriving a target adjustment position of an engine revolution speed adjusting mechanism of a vehicular engine so as to run the vehicle at the cruise running speed set by the second means on the basis of the derived engine torque, engine revolution speed, gear position, and running resistance;
   (h) eighth means for deriving an adjustment position of the engine revolution speed adjusting mechanism of the vehicular engine;
   (i) ninth means for producing and outputting a vehicle speed control command on the basis of a difference between the target adjustment position of the engine revolution speed adjusting mechanism derived by the seventh means and the adjustment position of the engine revolution speed adjusting mechanism derived by the eight means and gear position of the vehicular transmission; and
   (j) tenth means responsive to the vehicle speed command outputted by the ninth means for actuating the engine speed adjusting mechanism to displace toward the target adjustment position derived by the eighth means.

2. The system according to claim 1, which further comprises:
   (a) eleventh means for deriving a movement stroke of a vehicle body of the vehicle with respect to each road wheel;
   (b) twelfth means for deriving a total weight of the vehicle body on the basis of movement stroke of the vehicle body; and
   (c) thirteenth means for deriving a gradient of a road on which the vehicle runs and wherein the third means derives the running resistance of the vehicle on the basis of the total weight of the vehicle body derived by the twelfth means and road gradient derived by the thirteenth means.

3. The system according to claim 2, wherein the third means drives the running resistance D using the following equation: $D = \mu W + W \sin \delta + K \cdot S \cdot v_s^2$, wherein $\mu$ denotes a rolling resistance of the vehicle. W denotes the total weight of the vehicle body derived by the twelfth means, $\delta$ denotes the road gradient derived by the thirteenth means, K denotes an air resistance of the vehicle, S denotes a front surface projecting area, and $v_s$ denotes a target vehicle speed at which the vehicle cruises set by the second means.

4. The system according to claim 3, wherein the twelfth means derives the total weight W of the vehicle body using the following equation: $W = W_o + \Delta W = W_o + 1/k$, wherein $W_o$ denotes a weight of the vehicle body only, $\Delta W$ denotes an increased amount of the weight of the vehicle including a weight of a vehicle occupant, l denotes a straight distance between a center gravity with respect to the weight $W_o$ of the vehicle body only and a center gravity G' with respect to the sum of weight W ($= W + \Delta W$), the straight distance l being derived on the basis of the movement stroke derived by the eleventh means, and k denotes a spring constant of a suspension link.

5. The system according to claim 1, wherein the sixth means derives the engine torque on the basis of the running resistance derived by the sixth means and gear position of the vehicular transmission derived by the fifth means.

6. The system according to claim 5, wherein the sixth means derives the engine torque $T_e$ using the following equation: $T_e = R / \gamma m \eta m \gamma n \eta n \times D$, wherein R denotes a tire radius. D denotes the running resistance derived by the sixth means, $\gamma m$ denotes a gear ratio of the vehicular transmission in the gear position derived by the fifth means, $\eta m$ denotes a transmission efficiency in the gear position derived by the fifth means, $\gamma n$ denotes a final reduction gear ratio, and $\eta n$ denotes a final transmission efficiency.

7. The system according to claim 1, wherein the ninth means comprises:
   (k) eleventh means for deriving a difference between the target adjustment position of the engine speed adjusting mechanism derived by the seventh means and the adjustment position of the engine speed adjusting mechanism derived by the eighth means;
   (l) twelfth means for deriving a second difference between a target cruising speed set by the second means and the vehicle speed derived by the first means and deriving a third difference between the present vehicle speed derived by the first means and a previous vehicle speed one period before a predetermined period;
   (m) thirteenth means for deriving an error function on the basis of the errors derived by the eleventh and twelfth means as a change rate of the adjustment position of the engine speed adjusting mechanism and producing and outputting the speed control command to the tenth means on the basis of the change rate of the adjustment position of the engine revolution speed adjusting mechanism.

8. The system according to claim 7, wherein the tenth means comprises: fourteenth means for actuating the engine speed adjusting mechanism to displace toward the target adjustment position derived by the seventh means; fifteenth means for comparing the error function derived by the thirteenth means with a predetermined error function value; and sixteenth means for selecting the gear position of the vehicular transmission according to the comparison result by the fifteenth means.

9. The system according to claim 1, wherein the fourth means derives the engine revolution speed $N_e$ using the following equation $N_e = (\gamma m \ \eta n/2\pi R).60$, $v_s$, wherein $\gamma m$ donates a gear ratio of the gear position of the vehicular transmission, $\gamma n$ denotes a final reduction gear ratio, and R denotes a tire radius, and $v_s$ denotes the set cruising speed.

10. The system according to claim 1, which further comprises:
(a) eleventh means for operatively returning the vehicle speed to the set cruising speed before either a brake mechanism is operated or gear shift position of the vehicular transmission is changed, and wherein the sixth means derives the engine torque on the basis of the adjustment position of the engine speed adjusting mechanism derived by the eighth means and engine revolution speed derived by the fourth means when the eleventh means is activated, the third means derives the running resistance on the basis of the engine torque derived by the sixth means, and the transmission gear position derived by the fifth means, and the seventh means derives the target adjustment position on the basis of the engine torque derived by the sixth means and engine revolution speed derived by the fourth means.

11. The system according to claim 10, which further comprises twelfth means for calculating a vehicle acceleration on the basis of difference between the vehicle speed derived by the first means and a previous vehicle speed one period before a predetermined period whenever the predetermined period is elapsed and wherein the sixth means derives the engine torque on the basis of the adjustment position of the engine speed adjustment mechanism derived by the eighth means, the running resistance derived by the third means, the vehicle acceleration derived by the twelfth means, and the gear shift position derived by the fifth means.

12. The system according to claim wherein after the predetermined period has elapsed since the operation of the eleventh means, the sixth means derives the engine torque $T_e$ using the following equation: $T_e = (R/\gamma m \eta n.\gamma n.\eta n.\eta n)(D + W\alpha/g + J\alpha/R^2)$, wherein D denotes the running resistance derived by the third means, $\alpha$ denotes the vehicle acceleration derived by the twelfth means. W denotes a weight of a vehicle body, J is expressed as $J_W.\eta n^2.\eta n.J_p + (J_T + J_E)/\gamma m^2.\gamma n^2.\eta m.\eta n$, $J_W$ denotes road wheel inertia Jp denotes a propeller inertia, $J_T$ denotes a turbine inertia, $J_E$ denotes an engine inertia, $\gamma m$ and $\eta m$ denote vehicular transmission gear ratio and transmission efficiency in the gear position derived by the fifth means, $\gamma n$ and $\eta n$ denote a final reduction gear ratio and a final reduction gear ratio transmission efficiency.

13. The system according to claim 11, which further comprises a thirteenth means for storing the set cruising speed when the second means sets the cruise running speed and wherein the ninth means produces and outputs a vehicle speed control command on the basis of the vehicle acceleration derived by the twelfth means so as to increase the vehicle speed at a constant rate until the vehicle speed reaches a predetermined range of the set cruising speed stored in the thirteenth means.

14. The system according to claim 1, wherein the second means comprises a manual set switch which is turned off after once turn on thereof so that the vehicle speed derived by the first means when the manual set switch is turned off after it is once turned off is set to the cruising speed.

15. The system according to claim 14, wherein the adjustment position of the engine speed adjusting mechanism is set to zero when the manual set switch is turned on.

16. The system according to claim 14, wherein the sixth means derives the engine torque on the basis of an actual adjustment position of the engine speed adjusting mechanism derived by the eighth means and actual engine revolution speed derived by the fourth means, the third means derives the running resistance on the basis of the gear position of the vehicular transmission derived by the fifth means, and the engine torque derived by the sixth means when the manual set switch is turned Off after once turn on thereof.

17. The system according to claim 16, which further comprises eleventh means for calculating a vehicle acceleration from a difference between the vehicle speed derived by the first means and a previous vehicle speed derived by the first means one period before a predetermined period whenever the predetermined period has elapsed and wherein the sixth means derives the engine torque on the basis of the running resistance derived by the third means with the vehicle acceleration being set to zero, the fourth means derives the engine revolution speed when the vehicle cruises at the cruising speed set and stored by the second means, the seventh means derives the target adjustment position of the engine speed adjusting mechanism on the basis of the engine torque derived by the sixth means and engine resolution speed derived by the fourth means when the vehicle cruises at the cruising speed set and stored by the second means, and the ninth means produces and outputs the vehicle speed control command so that the adjustment position of the engine speed adjusting mechanism stably coincides with the target adjustment position derived by the seventh means.

18. The system according to claim 1, which further comprises a manual acceleration switch which is activated after either a brake mechanism is operated or gear shift position of the vehicular transmission is changed, and wherein when the manual acceleration switch is turned on, the sixth means derives the engine torque on the basis of an actual adjustment position derived by the eighth means and actual engine revolution speed derived by the fourth means, the third means derives the running resistance on the basis of the gear position of the vehicular transmission derived by the fifth means, and the engine torque derived by the fifth means.

19. The system according to claim 18, which further comprises eleventh means for calculating a vehicle acceleration from a difference between the vehicle speed derived by the first means and a previous vehicle speed derived by the first means one period before a predetermined period whenever the predetermined period has elapsed and wherein the sixth means derives the engine torque on the basis of the running resistance derived by the third means with the vehicle acceleration being set to zero, the fourth means derives the engine revolution speed when the manual acceleration switch is turned on, the seventh means derives the target adjustment position of the engine speed adjusting mechanism on the basis of the engine torque derived by the sixth means and engine revolution speed derived by the fourth means when the manual acceleration switch is turned on, and the ninth means produces and outputs the vehicle speed control command so that the adjustment position of the engine speed adjusting mechanism stably coincides with the target adjustment position derived by the seventh means.

20. The system according to claim 19, wherein the second means sets the cruising speed which is the vehicle speed derived by the first means when the manual acceleration switch is turned off after turn on thereof and the ninth means produces the vehicle speed control command so as to increase the vehicle speed at a constant rate determined by the target adjustment position derived by the seventh means.

21. A method for automatically running a vehicle at a desired cruising speed, comprising the steps of:
   (a) providing means for setting a desired cruise running speed;
   (b) determining whether the means sets the desired cruise running speed;
   (c) deriving a vehicle speed;
   (d) deriving an engine revolution speed;
   (e) deriving an adjustment position of an engine speed adjusting mechanism of a vehicular engine;
   (f) deriving a gear shift position of a vehicle transmission;
   (g) deriving an engine torque;
   (h) deriving a running resistance of the vehicle;
   (i) deriving a target adjustment position of the engine speed adjusting mechanism so as to run the vehicle at the cruise running speed determined in the step (b) on the basis of the derived engine torque, engine revolution speed, gear position, and running resistance;
   (j) producing and outputting a vehicle speed control command on the basis of a difference between the target adjustment position of the engine speed adjusting mechanism derived in the step (h) and adjustment position of the engine speed adjusting mechanism derived in the step (e); and
   (k) actuating the engine speed adjusting mechanism to displace toward the target adjustment position in response to the vehicle speed control command.

22. The method according to claim 21, which further comprises the steps of:
   (l) deriving a total weight of a vehicle body including an increased amount of the vehicle body; and
   (m) deriving a gradient of a road on which the vehicle runs
   and wherein the step (h) derives the running resistance of the vehicle on the basis of the total weight derived in the step (l) and the gradient of the road derived in the step (m).

23. The method according to claim 21, which further comprises the step (l) of deriving an acceleration of the vehicle and wherein the step (h) derives the running resistance of the vehicle on the basis of the acceleration derived in the step (l) and engine torque derived in the step (g).

24. The method according to claim 21, which further comprises the steps of:
   (l) providing means capable of returning the vehicle speed to the cruise running speed before either a brake mechanism of the vehicle is operated or a shift position of the vehicle is changed; and
   (m) deriving a vehicle acceleration on the basis of the vehicle speed derived in the step (c).
   and wherein the step (i) derives the target adjustment position of the engine speed adjusting mechanism on the basis of the derived engine torque, engine revolution speed, gear position, running resistance, and acceleration.

25. The method according to claim 21, wherein the step (h) derives the running resistance immediately after the step (b) determines that the means provided in the step (a) sets the cruise running speed.

26. The method according to claim 21, which further comprises the steps of:
   (l) providing means for setting an acceleration of the vehicle at a constant rate;
   (m) determining whether the means provided in the step (l) is set to the acceleration of the vehicle at the constant rate; and
   (n) determining whether the means provided in the step (l) is reset to interrupt the acceleration of the vehicle at the constant rate after set.
   and wherein the step (k) actuates the engine speed adjusting mechanism to displace toward the target adjustment position so that the vehicle speed increases at the constant rate when determining in the step (m) that the means provided in the step (l) is set and so that the vehicle speed coincides with the vehicle speed when determining in the step (n) that the means provided in the step (l) is reset.

* * * * *